United States Patent
Vyas et al.

(10) Patent No.: US 11,334,348 B2
(45) Date of Patent: May 17, 2022

(54) UTILIZING MACHINE LEARNING TO IDENTIFY AND CORRECT DIFFERENCES IN APPLICATION PROGRAMMING INTERFACE (API) SPECIFICATIONS

(71) Applicant: Accenture Global Solutions Limited, Dublin (IE)

(72) Inventors: Uchit Vyas, Bedok (SG); Jacky Sung-Chit Wong, Ryde (AU)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/947,782

(22) Filed: Aug. 17, 2020

(65) Prior Publication Data
US 2021/0216308 A1 Jul. 15, 2021

(30) Foreign Application Priority Data
Jan. 15, 2020 (SG) .............................. 10202000378S

(51) Int. Cl.
 *G06F 8/71* (2018.01)
 *G06F 9/54* (2006.01)
 *G06N 20/00* (2019.01)
(52) U.S. Cl.
 CPC .............. *G06F 8/71* (2013.01); *G06F 9/547* (2013.01); *G06N 20/00* (2019.01)
(58) Field of Classification Search
 USPC ....................................................... 717/121
 See application file for complete search history.

(56) References Cited

U.S. PATENT DOCUMENTS

| | | | | |
|---|---|---|---|---|
| 9,003,358 B2* | 4/2015 | Sellers | ...................... | G06F 8/20 |
| | | | | 717/104 |
| 2015/0363374 A1* | 12/2015 | Lees | ........................ | G06F 8/73 |
| | | | | 715/256 |
| 2019/0095318 A1* | 3/2019 | Bahrami | ............. | G06F 11/3676 |
| 2019/0196811 A1* | 6/2019 | Bahrami | ................... | G06F 8/10 |
| 2019/0332230 A1* | 10/2019 | Gueco | ................. | H04L 41/0896 |
| 2019/0332667 A1* | 10/2019 | Williams | ............ | G06F 16/3329 |
| 2019/0354390 A1* | 11/2019 | Gill | ....................... | G06F 9/4843 |
| 2019/0370098 A1* | 12/2019 | Schmiedehausen | .. | G06F 9/5033 |

* cited by examiner

*Primary Examiner* — John Q Chavis
(74) *Attorney, Agent, or Firm* — Harrity & Harrity, LLP

(57) ABSTRACT

A device may receive API specifications associated with APIs, and may store the API specifications in a data structure. The device may process the API specifications to identify a system level set of API specifications that includes API specifications utilized by multiple systems, a release level set of API specifications that includes API specifications with different release dates, and a version level set of API specifications that includes API specifications with different versions. The device may process the system level set of API specifications, with a machine learning model, to determine system level differences in the system level set of API specifications, and may correct the system level set of API specifications, based on the system level differences, to generate a corrected system level set of API specifications. The device may cause the corrected system level set of API specifications to be implemented in the multiple systems.

20 Claims, 21 Drawing Sheets

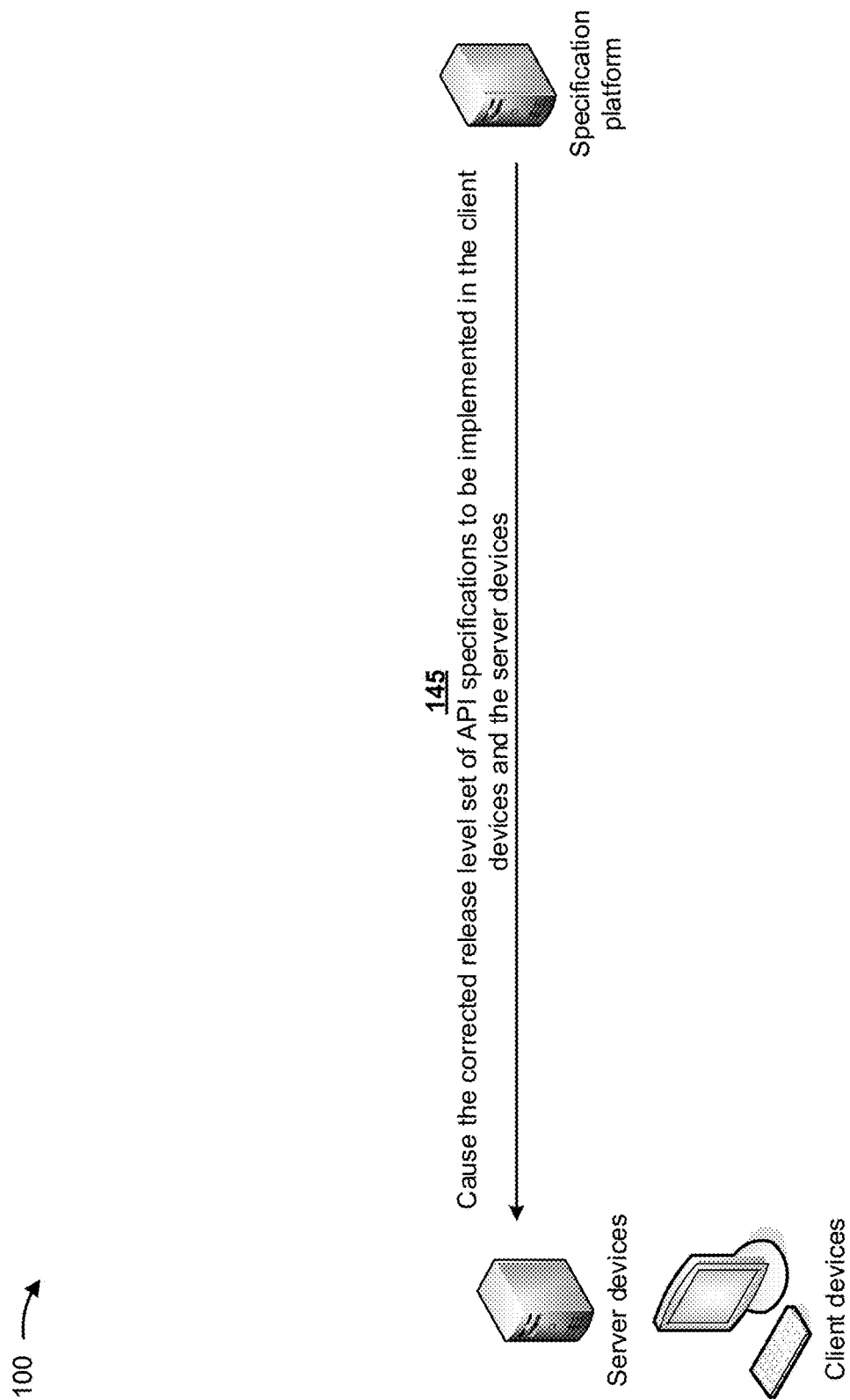

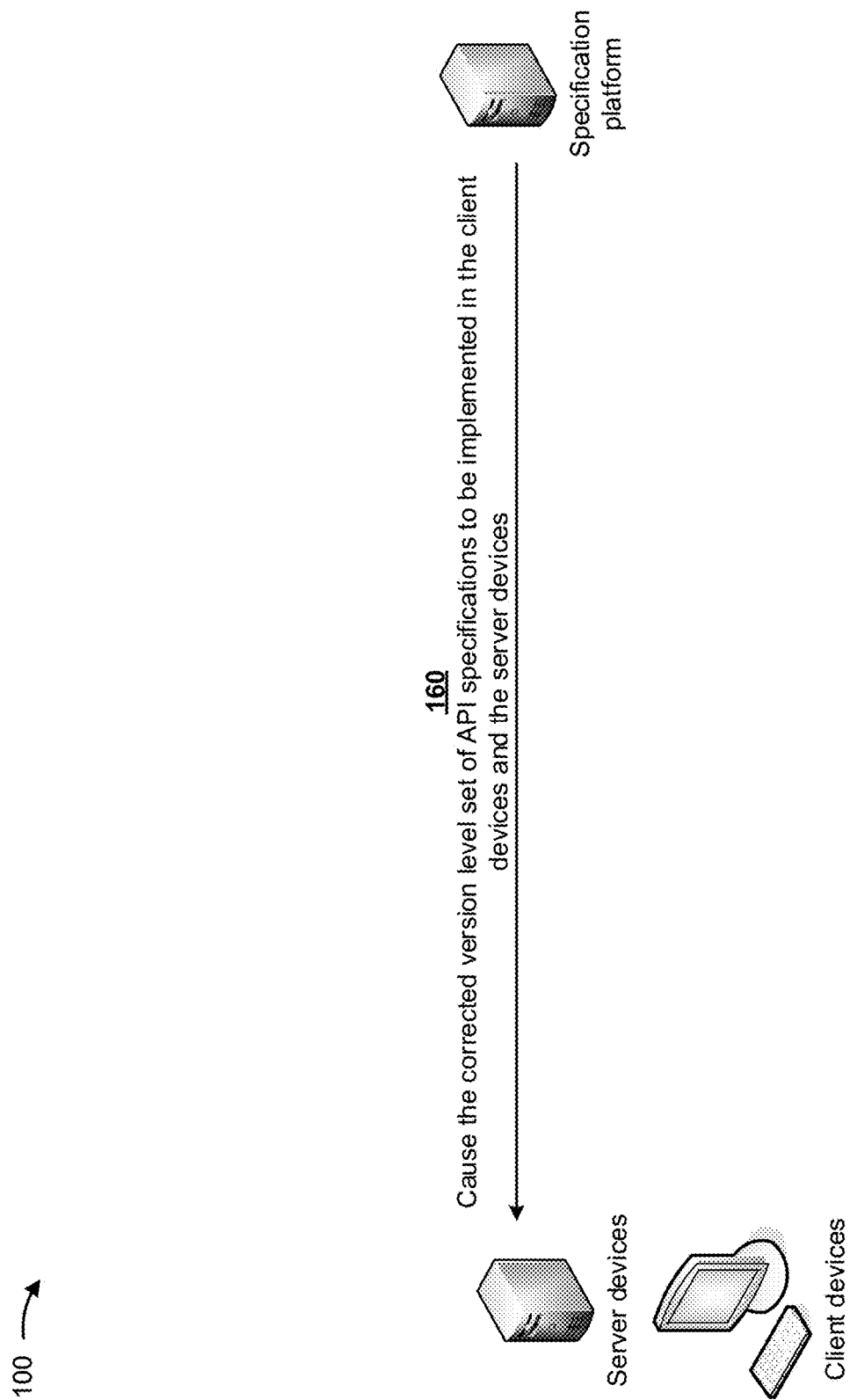

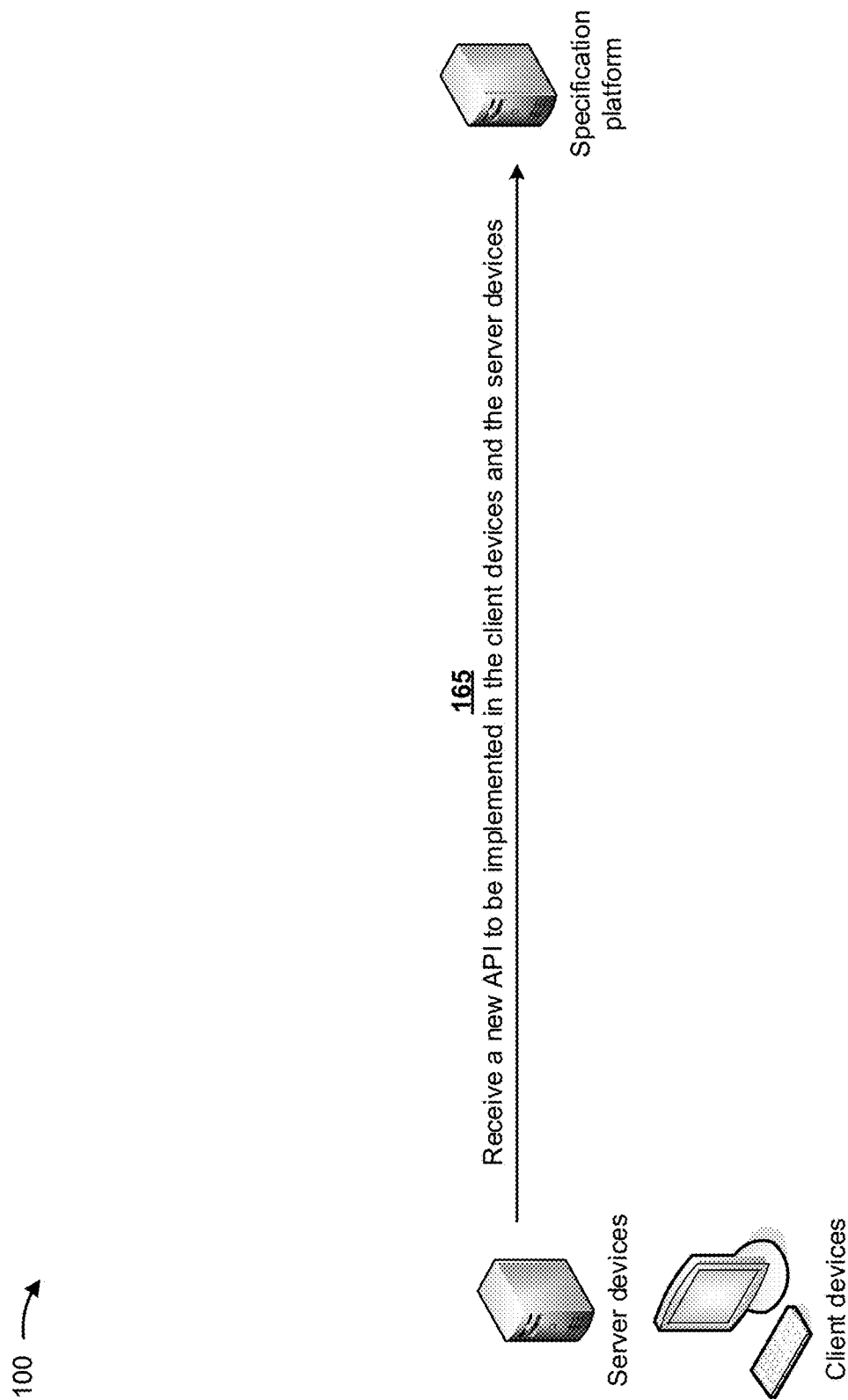

UTILIZING MACHINE LEARNING TO IDENTIFY AND CORRECT DIFFERENCES IN APPLICATION PROGRAMMING INTERFACE (API) SPECIFICATIONS

CROSS-REFERENCE TO RELATED APPLICATION

This application claims priority to Singaporean Provisional Application No. 10202000378S entitled "UTILIZING MACHINE LEARNING TO IDENTIFY AND CORRECT DIFFERENCES IN APPLICATION PROGRAMMING INTERFACE (API) SPECIFICATIONS," filed on Jan. 15, 2020. The entire content of which is expressly incorporated herein by reference.

BACKGROUND

An application programming interface (API) specification provides a broad understanding of how an API behaves and how the API links with other APIs. The API specification explains how the API functions and what results to expect when using the API. Currently, different mechanisms may be utilized in an entity (e.g., an organization, a corporation, an agency, and/or the like) to generate and manage API specifications.

SUMMARY

According to some implementations, a method may include receiving, by a device, API specifications associated with APIs, and storing the API specifications in a data structure associated with the device. The method may include processing the API specifications to identify a system level set of API specifications that includes API specifications utilized by multiple systems, a release level set of API specifications that includes API specifications with different release dates, and a version level set of API specifications that includes API specifications with different versions. The method may include processing the system level set of API specifications, with a machine learning model, to determine system level differences in the system level set of API specifications, and correcting the system level set of API specifications, based on the system level differences, to generate a corrected system level set of API specifications. The method may include causing the corrected system level set of API specifications to be implemented in the multiple systems, and replacing the system level set of API specifications, in the data structure, with the corrected system level set of API specifications.

According to some implementations, a device may include one or more memories and one or more processors configured to receive API specifications associated with APIs, and store the API specifications in a data structure associated with the device. The one or more processors may process the API specifications to identify a set of API specifications that includes API specifications utilized by multiple systems, and may process the set of API specifications, with a machine learning model, to determine differences in the set of API specifications. The one or more processors may correct the set of API specifications, based on the differences, to generate a corrected set of API specifications, and may cause the corrected set of API specifications to be implemented in the multiple systems. The one or more processors may replace the set of API specifications, in the data structure, with the corrected set of API specifications.

According to some implementations, a non-transitory computer-readable medium may store one or more instructions that, when executed by one or more processors of a device, may cause the one or more processors to receive API specifications associated with APIs, and store the API specifications in a data structure associated with the device. The one or more instructions may cause the one or more processors to receive a new API to be implemented in multiple systems, and process the new API and the API specifications, with a machine learning model, to identify issues with the new API. The one or more instructions may cause the one or more processors to correct the issues with the new API, to generate a corrected new API, and generate a new API specification based on the corrected new API. The one or more instructions may cause the one or more processors to store the new API specification and the corrected new API in the data structure; and cause the corrected new API to be implemented in the multiple systems.

DETAILED DESCRIPTION

Figure 1A:
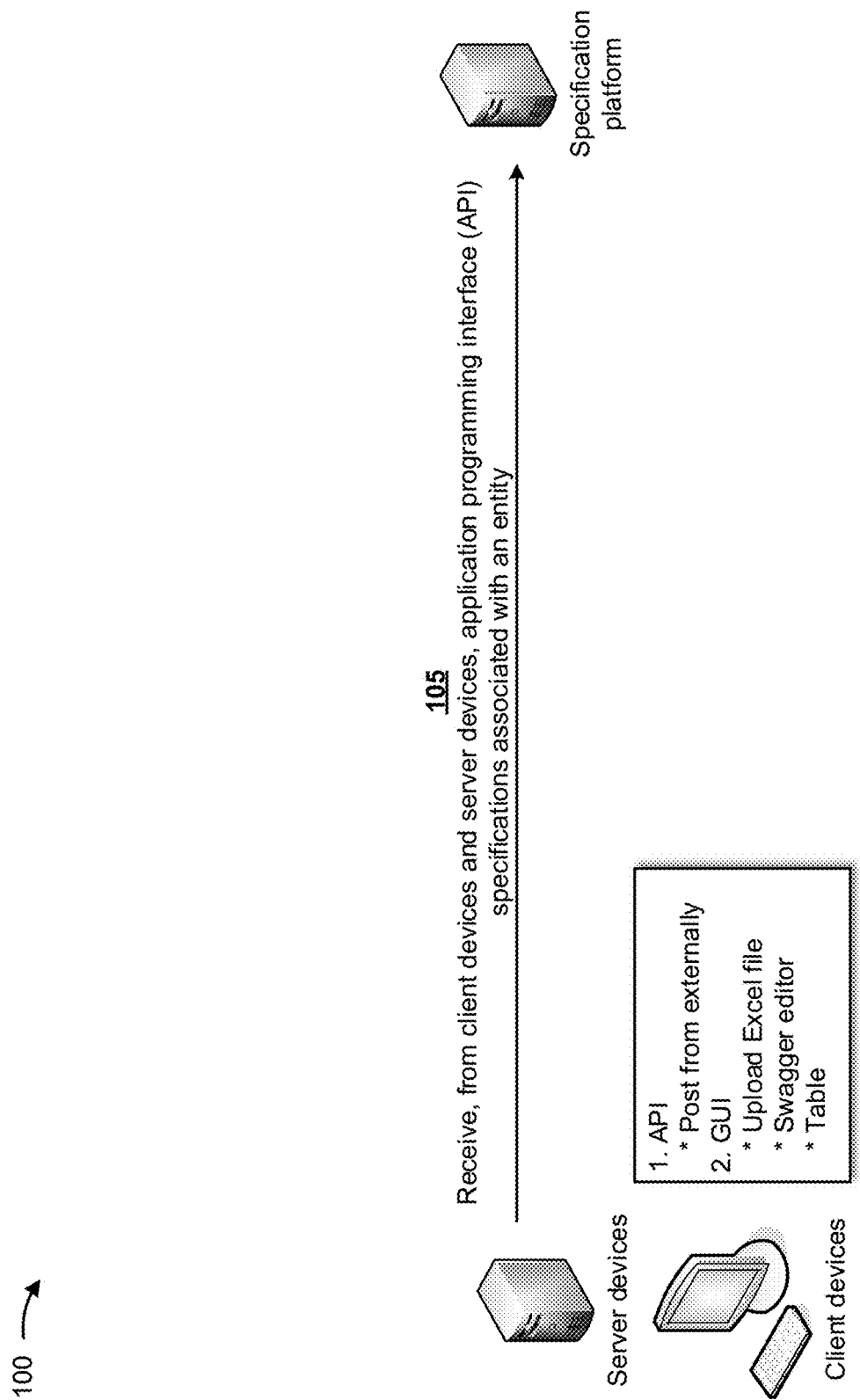
FIGS. 1A-1P are diagrams of one or more example implementations described herein.

The following detailed description of example implementations refers to the accompanying drawings. The same reference numbers in different drawings may identify the same or similar elements.

The current mechanisms to generate and manage API specifications fail to compare the API specifications and to identify design issues in APIs and corresponding API specifications before development of the APIs. When an API specification contains inaccuracies, a corresponding API will contain the same inaccuracies, which may result in system errors, system shutdown, network errors, and/or the like. Thus, current mechanisms to generate and manage API specifications may waste computing resources (e.g., processing resources, memory resources, communication resources, and/or the like), networking resources, human resources, and/or the like associated with executing the current mechanisms, generating inaccurate API specifications and/or APIs, correcting system errors and/or shutdowns due to inaccurate API specifications, and/or like.

Some implementations described herein provide a specification platform that utilizes machine learning to identify and correct differences in API specifications. For example, the specification platform may receive API specifications associated with APIs, and may store the API specifications in a data structure associated with the specification platform. The specification platform may process the API specifications to identify a system level set of API specifications that includes API specifications utilized by multiple systems, a release level set of API specifications that includes API specifications with different release dates, and a version level set of API specifications that includes API specifications with different versions. The specification platform may process the system level set of API specifications, with a machine learning model, to determine system level differences in the system level set of API specifications, and may correct the system level set of API specifications, based on the system level differences, to generate a corrected system level set of API specifications. The specification platform may cause the corrected system level set of API specifications to be implemented in the multiple systems, and may replace the system level set of API specifications, in the data structure, with the corrected system level set of API specifications.

In this way, the specification platform utilizes machine learning to identify and correct differences in API specifications. The specification platform may provide for design, creation, and generation of API specifications; identification and correction of differences among current API specifications; management of current API specifications; and/or the like. This, in turn, conserves computing resources, networking resources, and/or the like that would otherwise be wasted in executing the current mechanisms, generating inaccurate API specifications and/or APIs, correcting system errors and/or shutdowns due to inaccurate API specifications, and/or like.

Figure 1B:
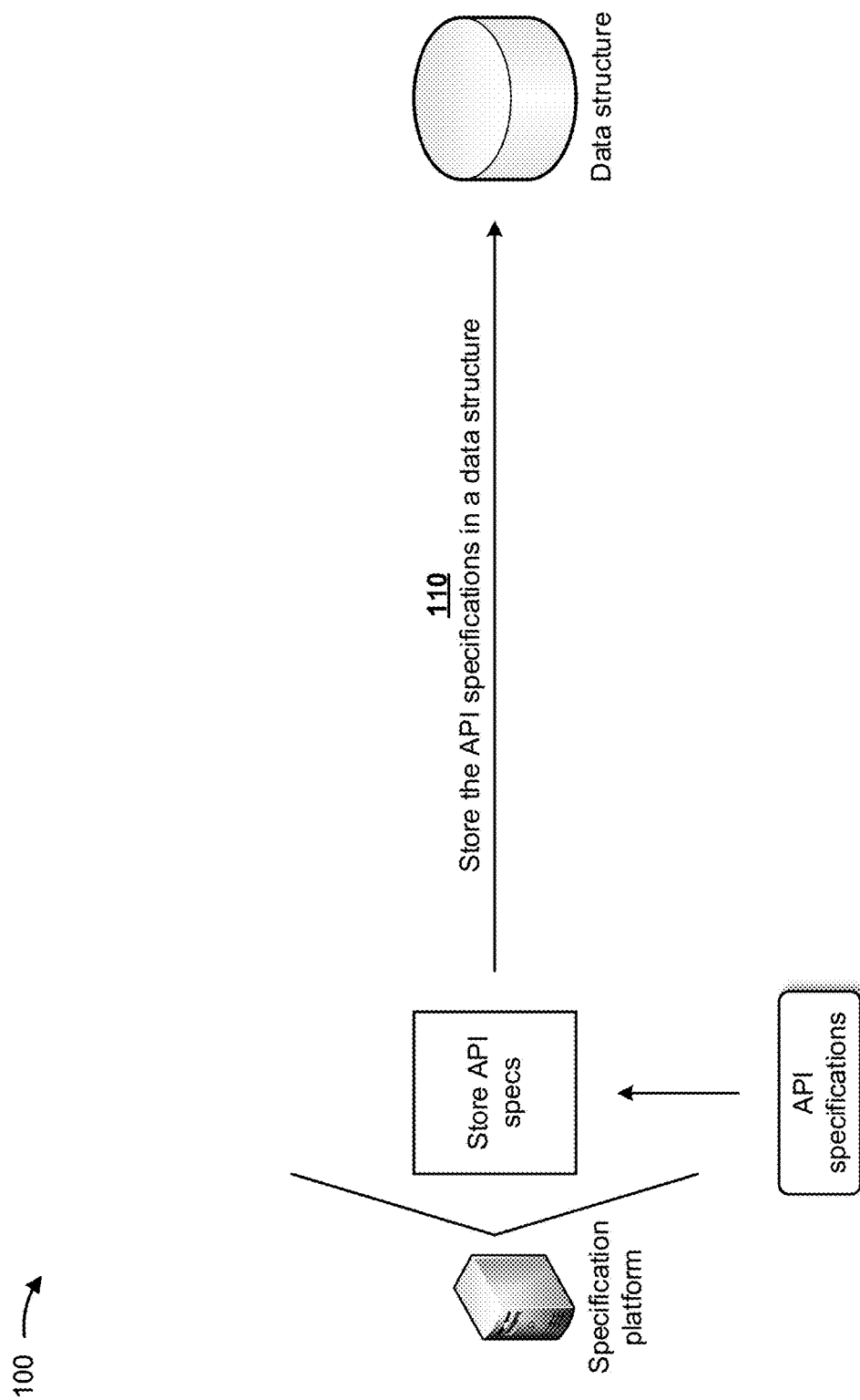
Figure 1C:
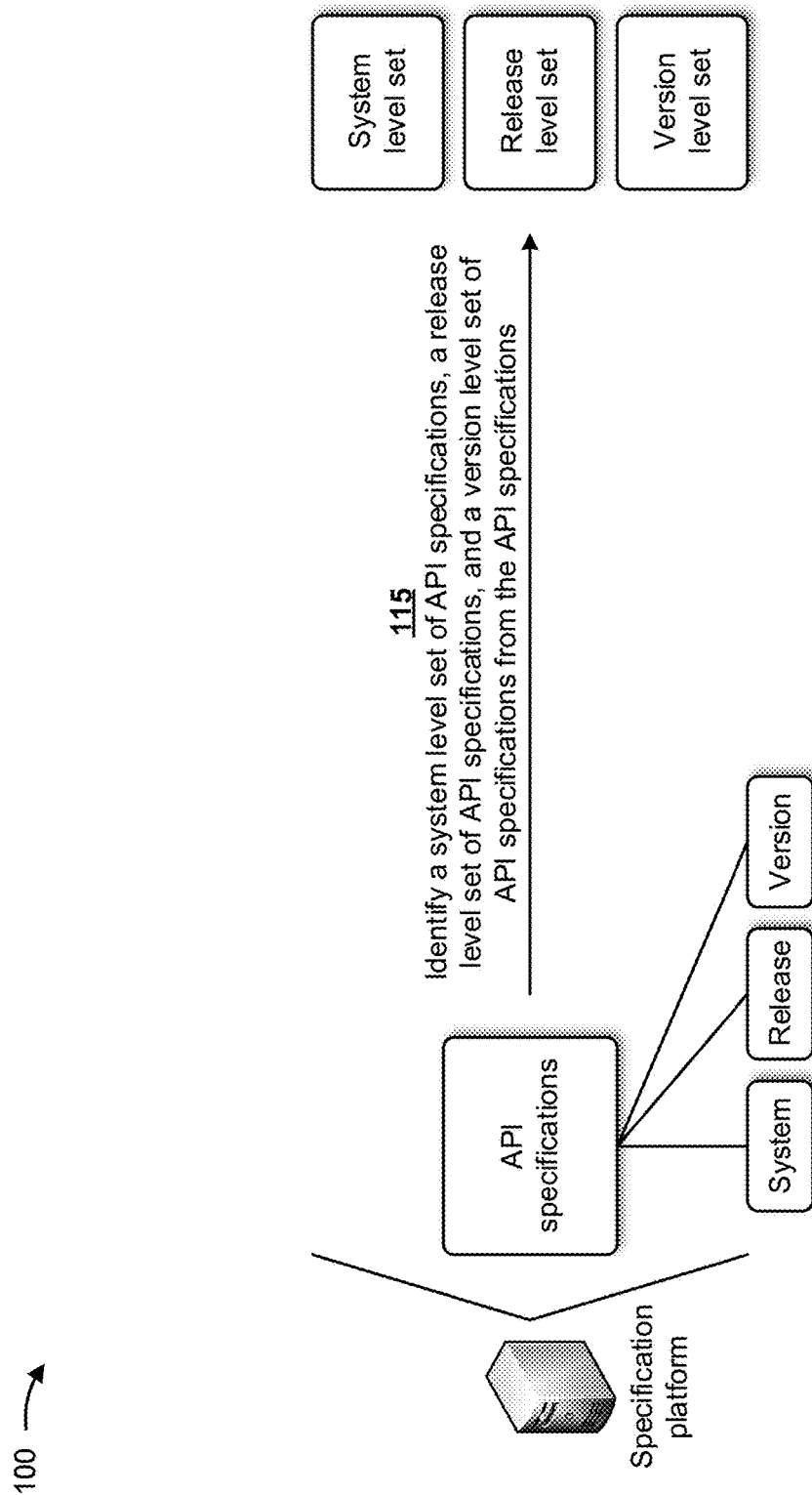
Figure 1D:
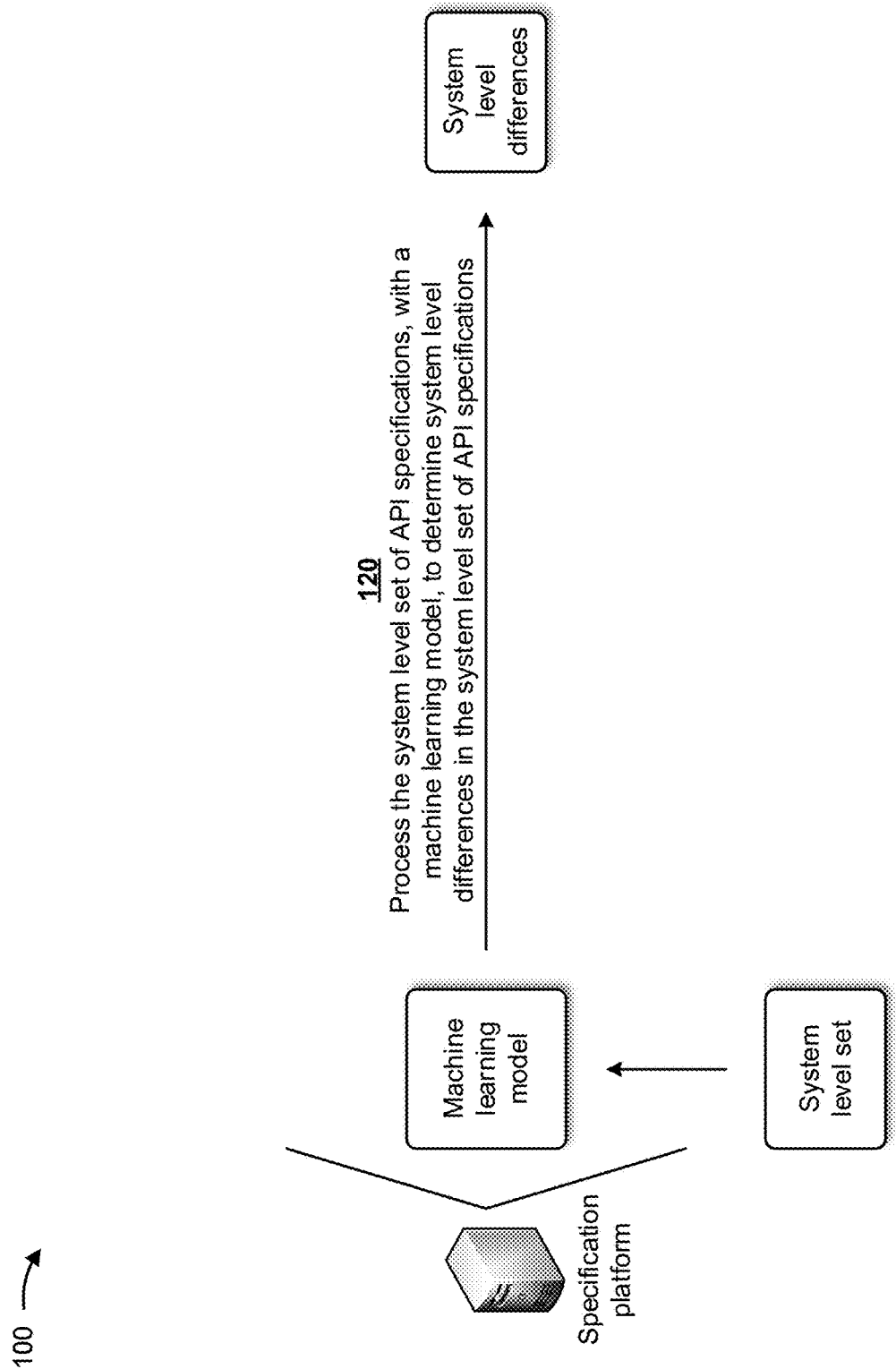
Figure 1E:
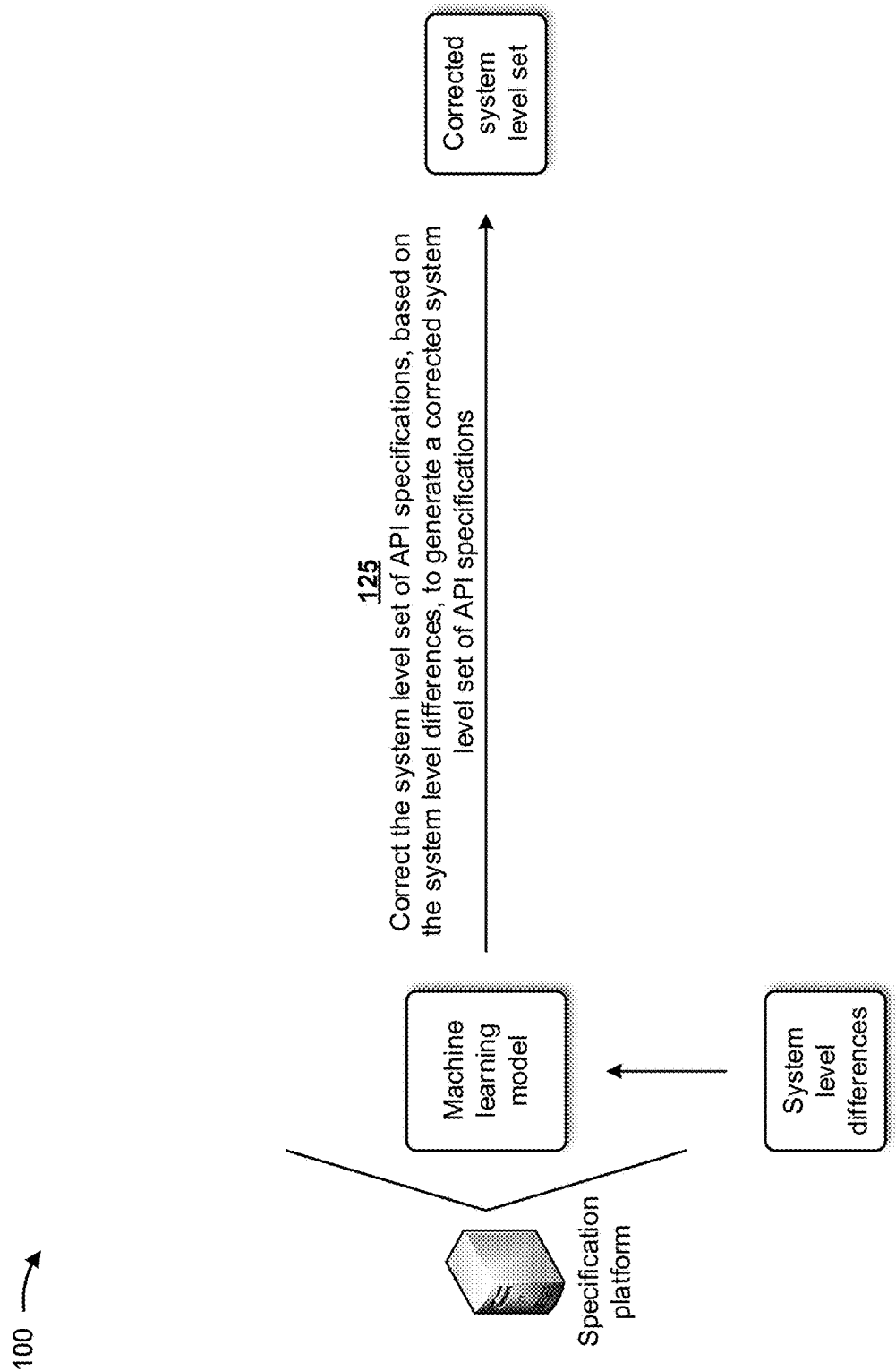
Figure 1F:
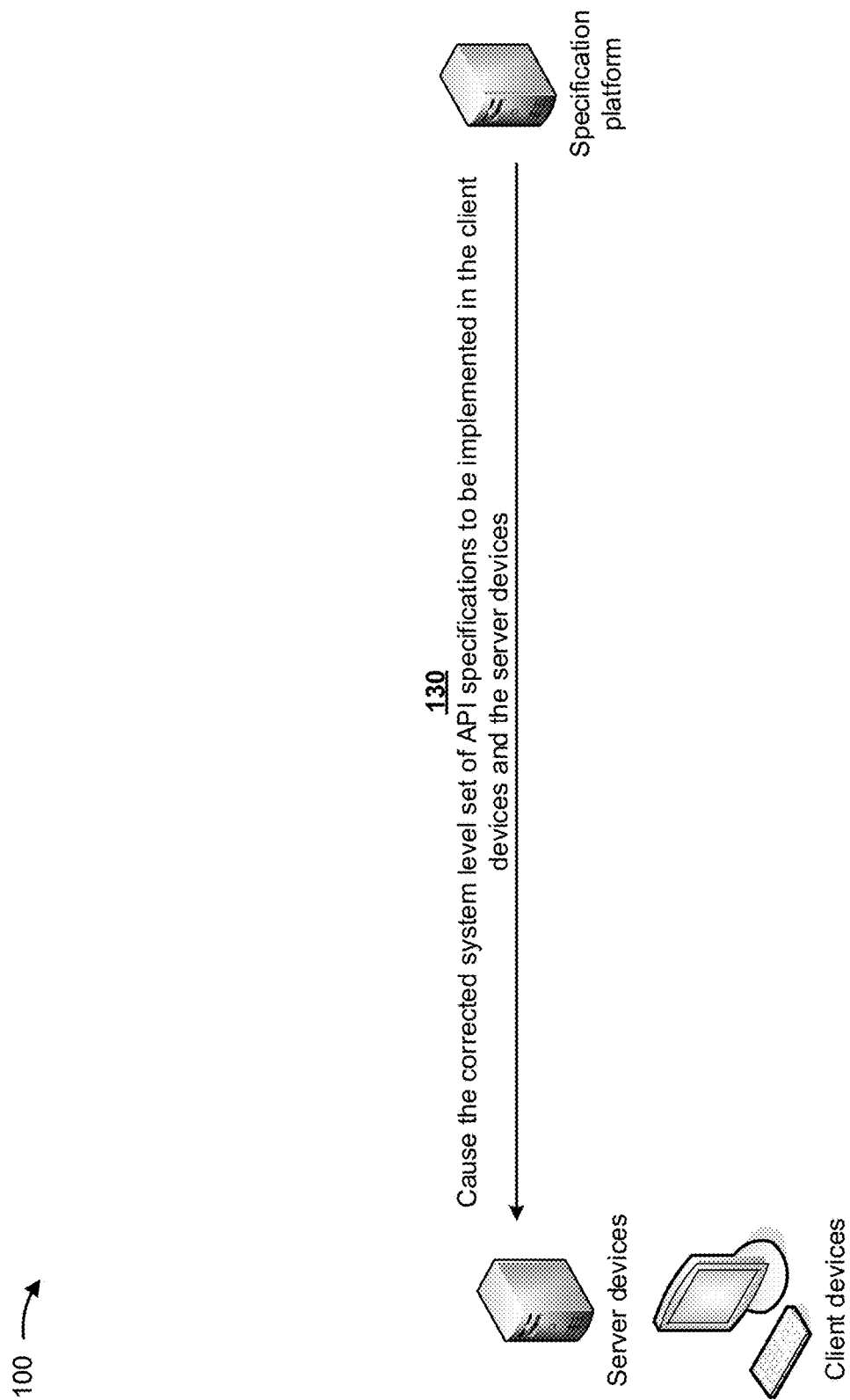
Figure 1G:
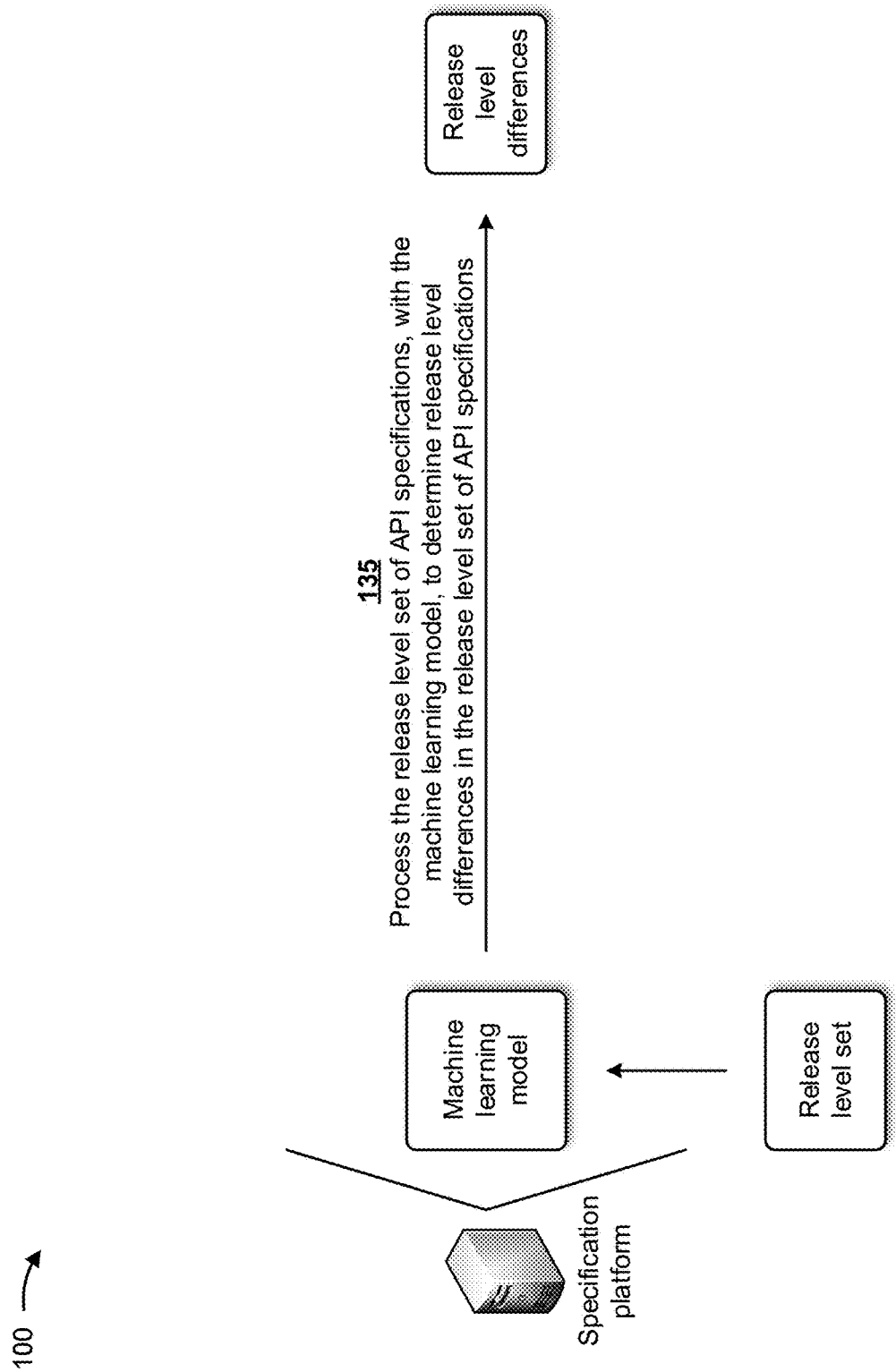
Figure 1H:
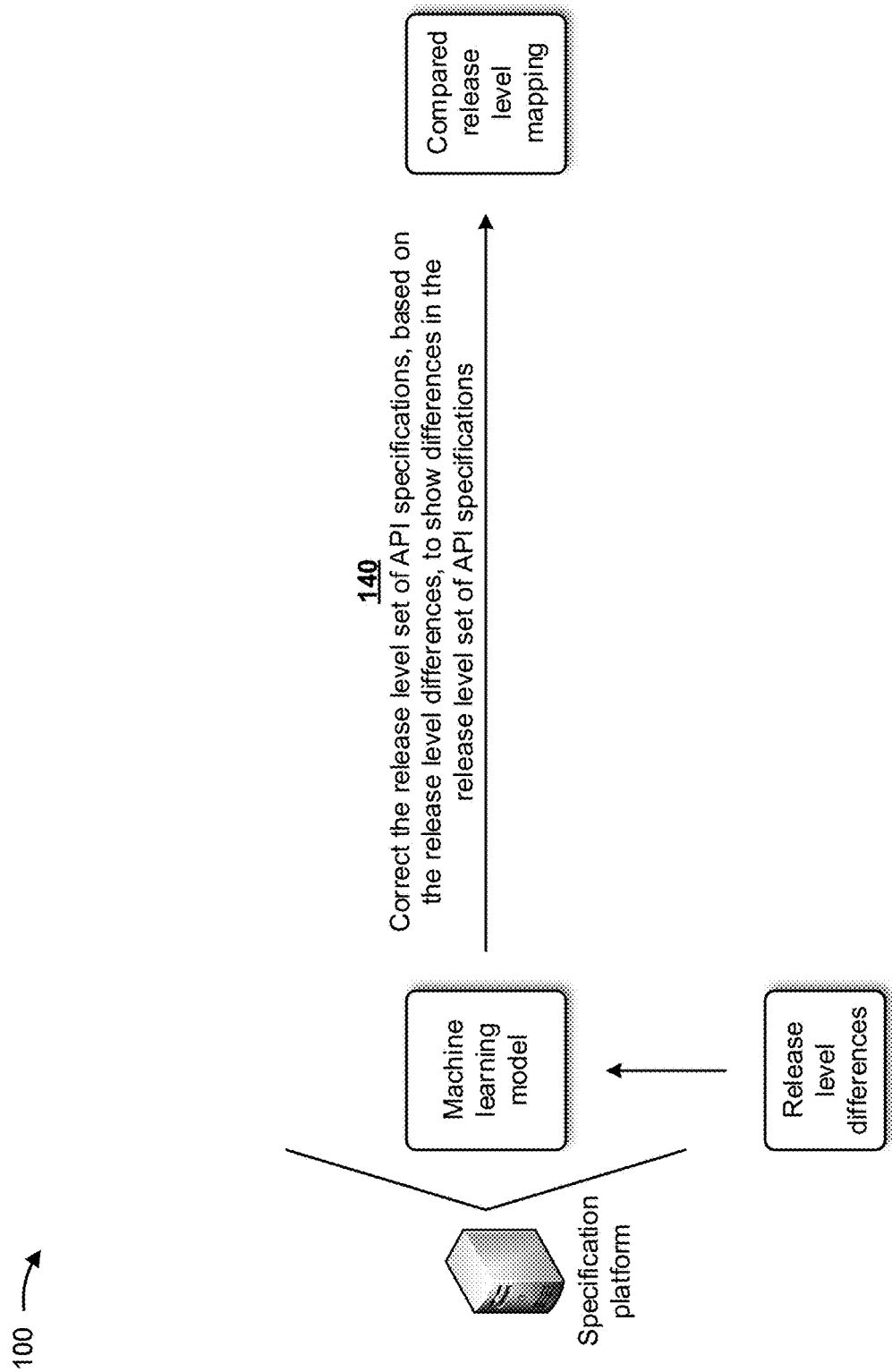
Figure 1J:
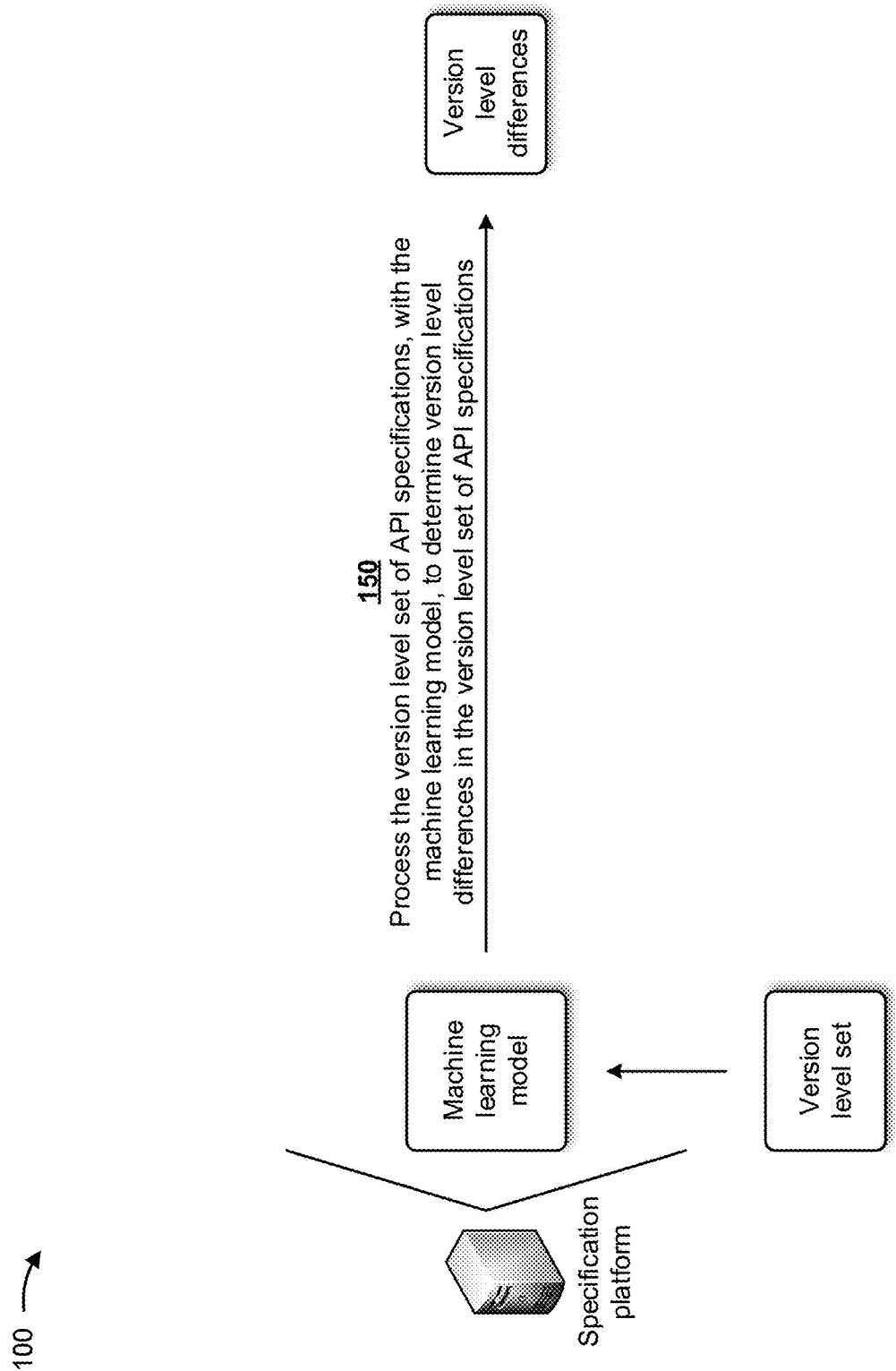
Figure 1K:
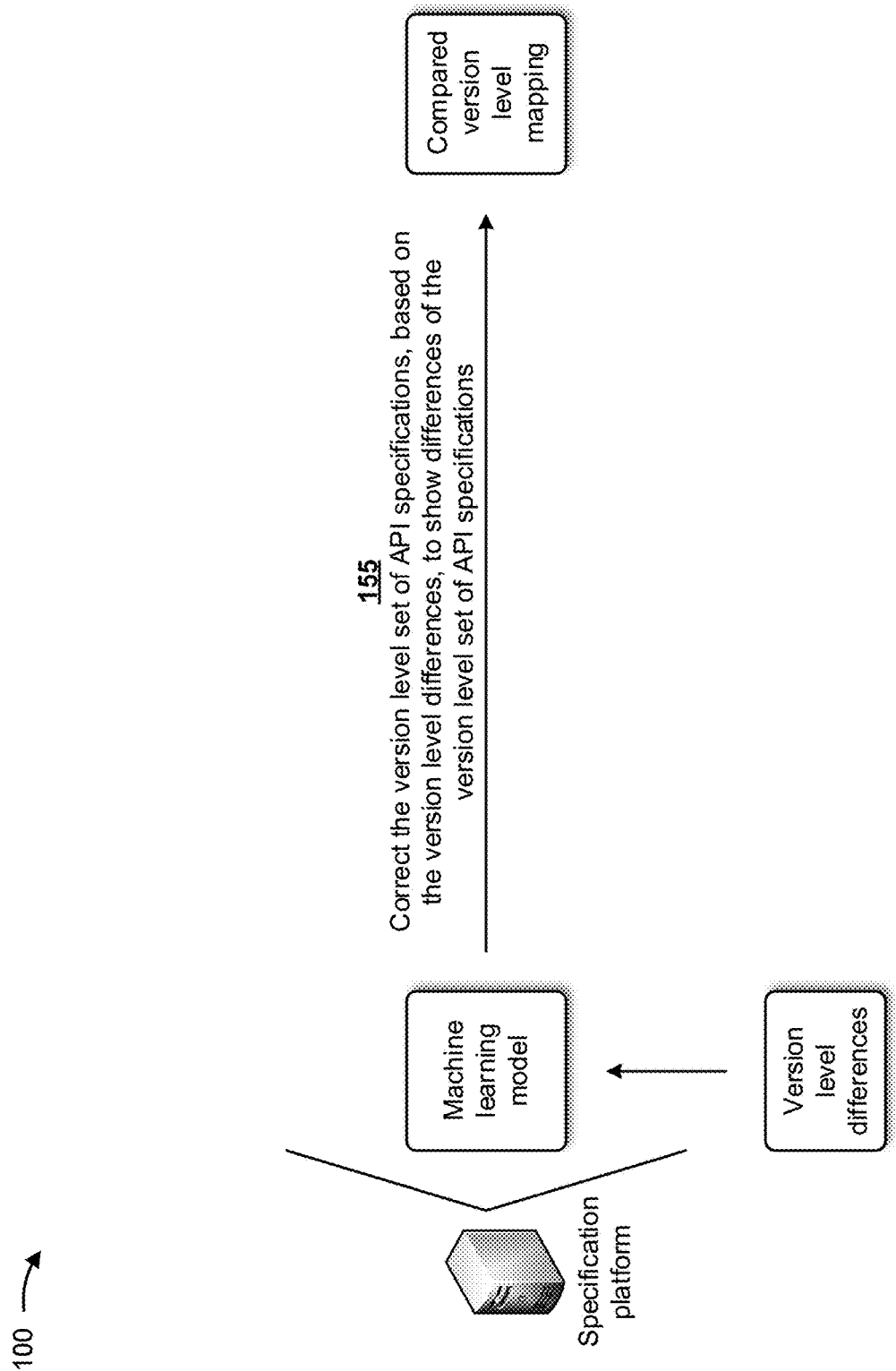
Figure 1N:
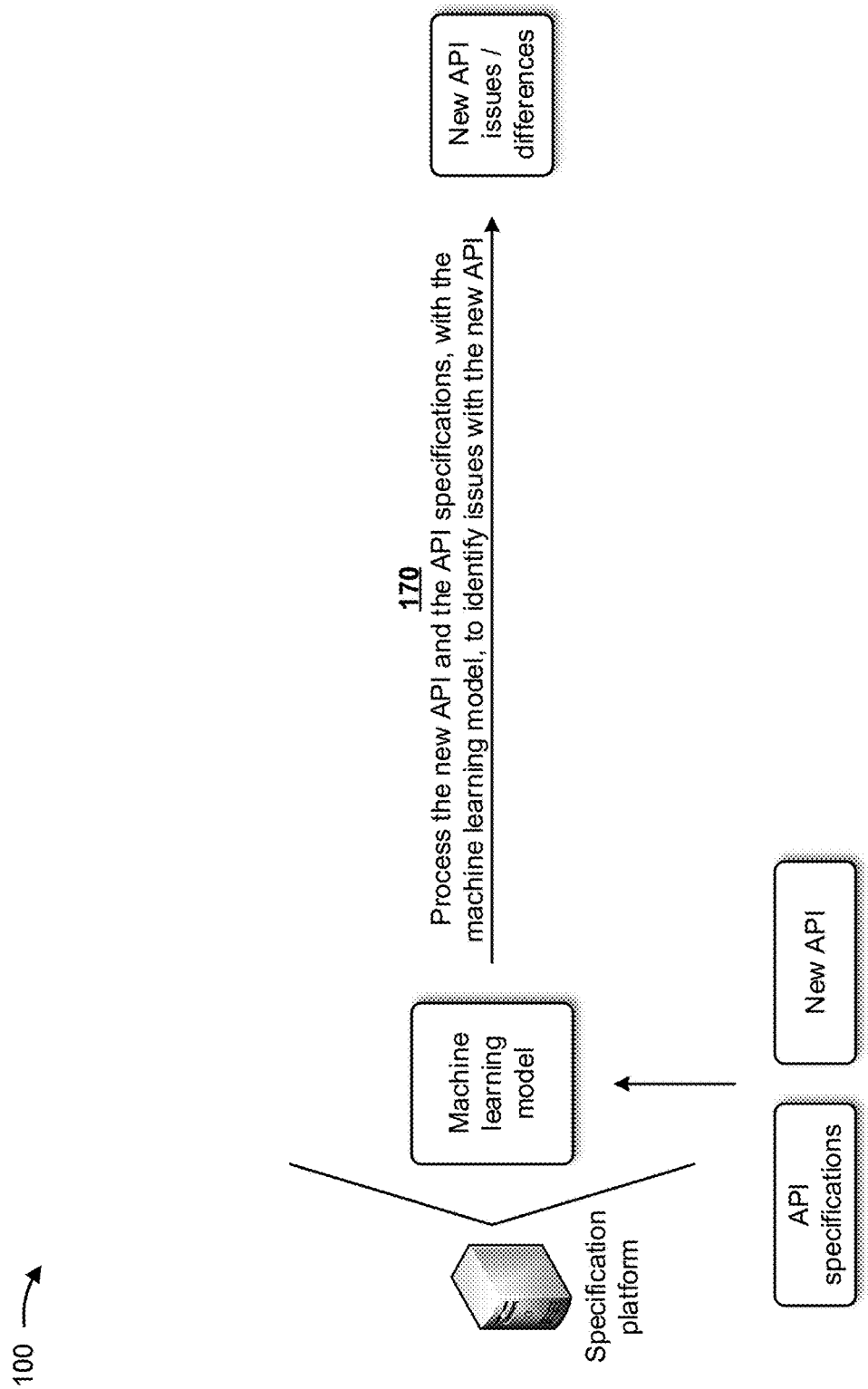
Figure 10:
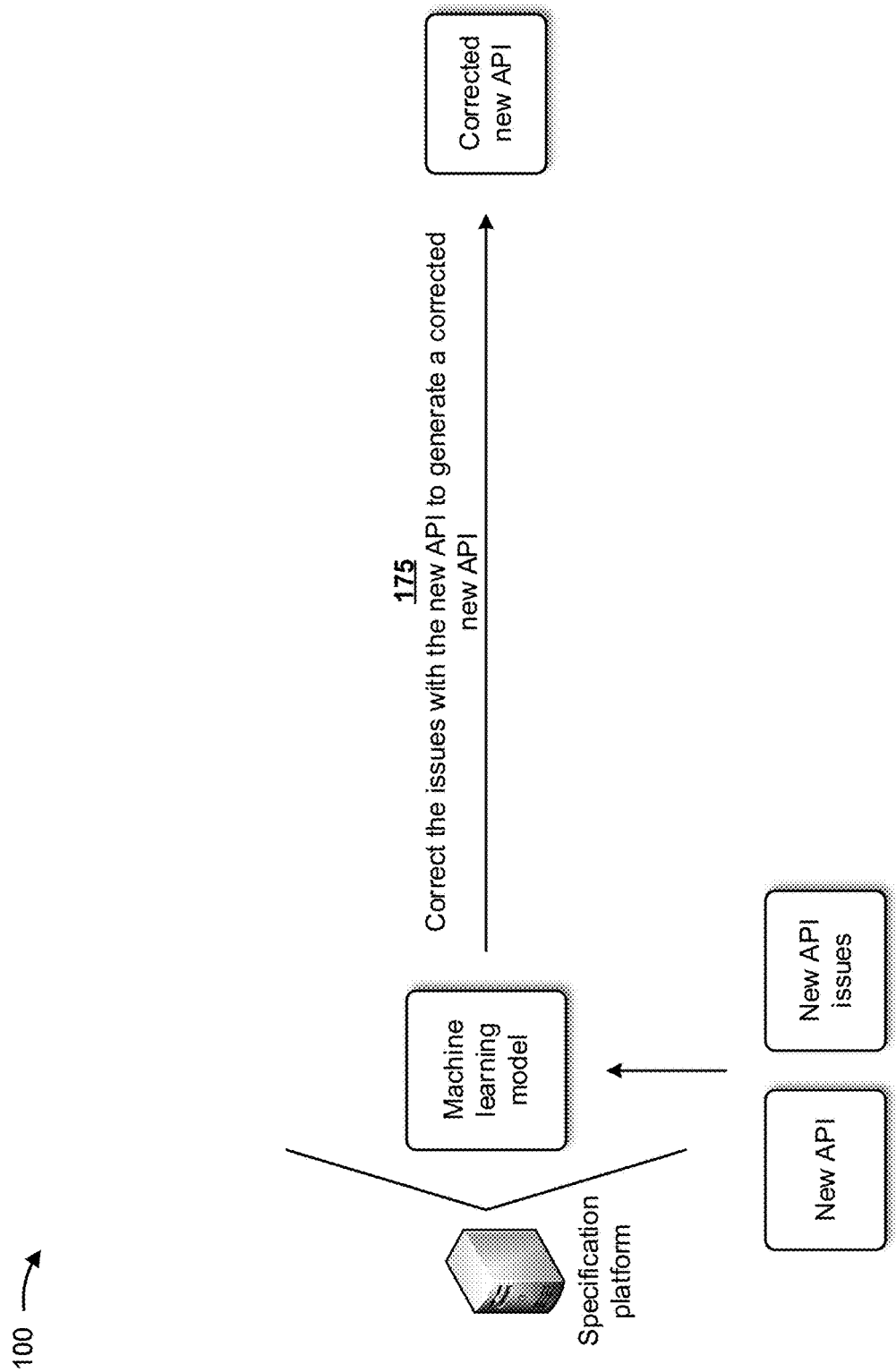
Figure 1P:
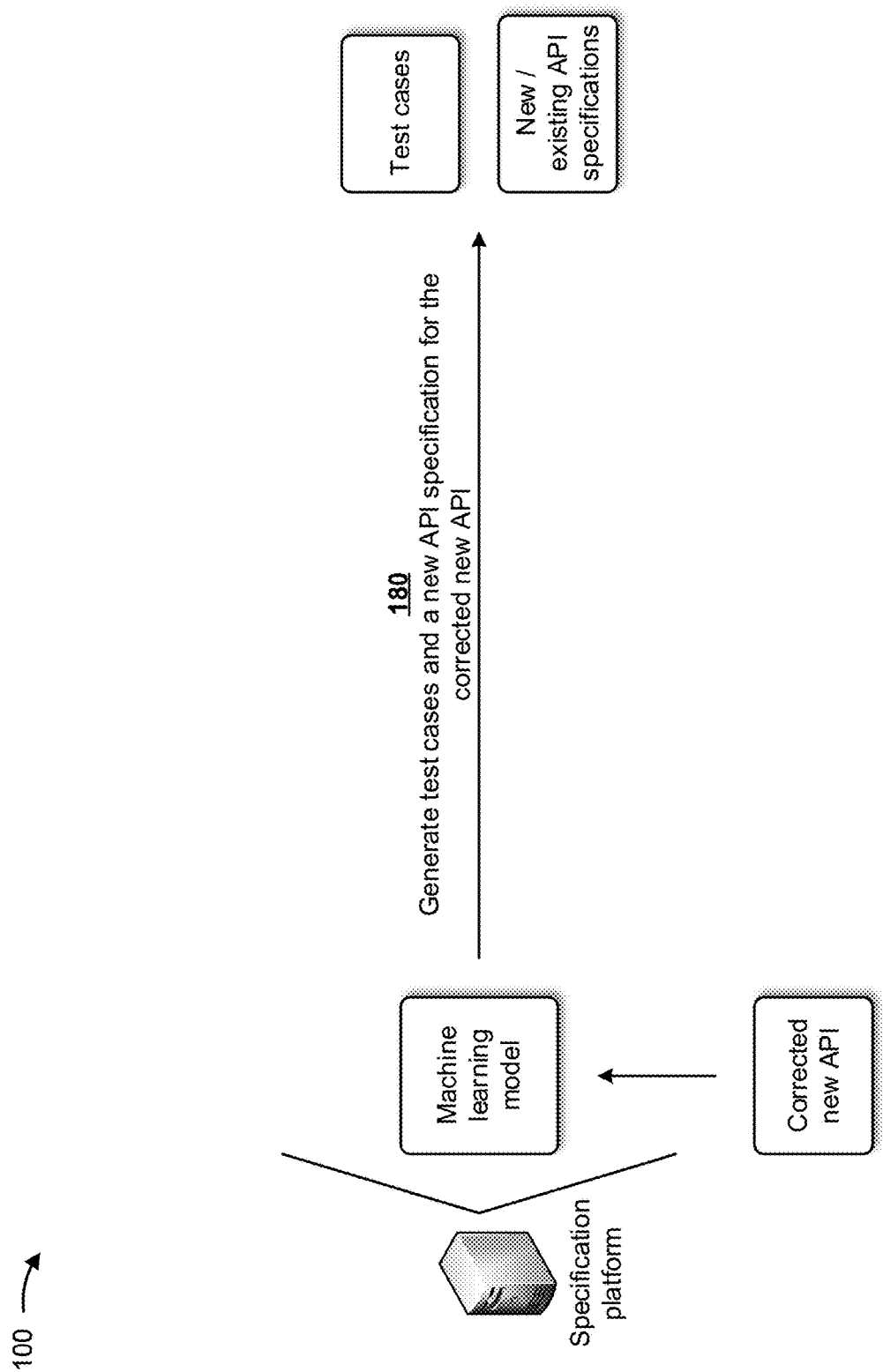

FIGS. 1A-1P are diagrams of one or more example implementations 100 described herein. As shown in FIG. 1A, one or more client devices may be associated with one or more server devices and a specification platform. The client devices may include mobile devices, computers, and/or the like associated with employees of an entity (e.g., a business, a financial institution, a government agency, and/or the like) that utilizes one or more APIs. The server devices may include one or more devices associated with the entity and that utilize the one or more APIs and/or API specifications. The specification platform may include a platform that utilizes machine learning to identify and correct differences in API specifications, as described herein.

As further shown in FIG. 1A, and by reference number 105, the specification platform may receive, from the client devices and/or the server devices, application programming interface (API) specifications associated with an entity. In some implementations, an API specification may include information identifying a corresponding API; an explanation of how the corresponding API functions, behaves, and/or links to other APIs; expected results when using the API; a variety of functions provided by the API; how the functions are called; what the functions do; a general overview of how the functions relate to one another; how the functions can be utilized to more fully leverage the API; and/or the like. An API specification may be associated with multiple sources, multiple systems, multiple releases, multiple versions, and/or the like. In some implementations, the specification platform may periodically receive the API specifications, may continuously receive the API specifications, may receive the API specifications based on one or more requests, and/or the like.

As further shown in FIG. 1A, the API specifications may be received from external posts, via a graphical user interface (GUI) that enables uploading of an Excel file, uploading via a Swagger editor, uploading of a table, and/or the like.

As shown in FIG. 1B, and by reference number 110, the specification platform may store the API specifications in a data structure. In some implementations, the data structure may include a database, a table, a list, a graph, a tree, and/or the like. The specification platform may store the API specifications in association with identifiers of the API specifications, information identifying corresponding systems, releases, versions, and/or the like associated with the API specifications, and/or the like. Thus, the specification platform may store the API specifications in a searchable format. For example, the specification platform may utilize the identifiers of the API specifications and/or the information identifying the corresponding systems, releases, versions, and/or the like to search the data structure for particular API specifications. In some implementations, the specification platform may periodically store the API specifications in the data structure, may continuously store the API specifications in the data structure, and/or the like.

As shown in FIG. 1C, and by reference number 115, the specification platform may process the API specifications to identify a system level set of API specifications, a release level set of API specifications, and a version level set of API specifications. In some implementations, each API specification may include a system level API specification, a release level API specification, and/or a version level API specification. The system level set of API specifications may include API specifications utilized by multiple systems (e.g., multiple server devices, multiple client devices, and/or the like). For example, the system level set of API specifications may include API specifications for a same API associated with different systems (e.g., associated with different client devices, different server devices, different applications, and/or the like). The release level set of API specifications may include API specifications associated with multiple releases. For example, the release level set of API specifications may include API specifications, for a same API, associated with different releases or release dates. The version level set of API specifications may include API specifications with multiple versions. For example, the version level set of API specifications may include API specifications, for a same API, associated with multiple, different versions.

In some implementations, the specification platform may perform natural language processing on the text of the API specifications, may parse the text of the API specifications, and/or the like, to generate processed/parsed text. In such implementations, the specification platform may process the processed/parsed text, with a machine learning model, to identify processed/parsed text associated with multiple systems, processed/parsed text associated with multiple releases, and processed/parsed text associated with multiple versions. The API specifications corresponding to the processed/parsed text associated with the multiple systems may correspond to the system level set of API specifications. The API specifications corresponding to the processed/parsed text associated with the multiple releases may correspond to the release level set of API specifications. The API specifications corresponding to the processed/parsed text associated with the multiple versions may correspond to the version level set of API specifications.

As shown in FIG. 1D, and by reference number 120, the specification platform may process the system level set of API specifications, with a machine learning model, to determine system level differences in the system level set of API specifications. In some implementations, the machine learning model may include a text matching model, such as a fuzzy string matching model, a string matching model (e.g., a match a prefix first model, a match a suffix first model, a match a best factor first model, and/or the like), a naïve model for pattern searching, and/or the like. In some implementations, the machine learning model may include a multi-label classifier that detects the system level differences in the system level set of API specifications. Each label in a classification may correspond to a specific system level difference type and a location of the system level difference type. In some implementations, the specification platform may provide a user interface by which a user may select a release (e.g., a release date), a process identifier (e.g., a process flow name), a set of systems (e.g., component names), and/or the like prior to processing the system level set of API specifications.

In some implementations, the specification platform may train the machine learning model with historical data (e.g., historical system level sets of API specifications and historical data showing system level differences in the historical system level sets of API specifications) to generate a trained machine learning model capable of determining system level differences in a system level set of API specifications. The specification platform may separate the historical data into a training set, a validation set, a test set, and/or the like. The training set may be utilized to train the machine learning model. The validation set may be utilized to validate results of the trained machine learning model. The test set may be utilized to test operation of the trained machine learning model.

In some implementations, the specification platform may train the machine learning model using, for example, an unsupervised training procedure and based on the historical data. For example, the specification platform may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, the specification platform may use a logistic regression classification technique to determine a categorical outcome (e.g., existence of a system level difference). Additionally, or alternatively, the specification platform may use a naïve Bayesian classifier technique. In this case, the specification platform may perform binary recursive partitioning to split the historical data into partitions and/or branches, and use the partitions and/or branches to determine outcomes (e.g., existence of a system level difference). Based on using recursive partitioning, the specification platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the specification platform may use a support vector machine (SVM) classifier technique to generate a non-linear boundary between data points in the training set. In this case, the non-linear boundary is used to classify test data into a particular class.

Additionally, or alternatively, the specification platform may train the machine learning model using a supervised training procedure that includes receiving input to the machine learning model from a subject matter expert, which may reduce an amount of time, an amount of processing resources, and/or the like to train the machine learning model relative to an unsupervised training procedure.

In some implementations, the specification platform may use one or more other model training techniques, such as a latent semantic indexing technique, and/or the like. For example, the specification platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the specification platform by making the model more robust to noisy, imprecise, or incomplete data, and by enabling the specification platform to detect patterns and/or trends undetectable to human analysts or systems using less complex techniques.

In some implementations, rather than training the machine learning model, the specification platform may obtain the trained machine learning model from another system or device that trained the machine learning model to generate the trained machine learning model. In this case, the specification platform may provide the other system or device with the historical data for use in training the machine learning model, and may provide the other system or device with updated historical data to retrain the machine learning model in order to update the trained machine learning model.

As shown in FIG. 1E, and by reference number 125, the specification platform (e.g., via the machine learning model) may correct the system level set of API specifications, based on the system level differences, to generate a corrected system level set of API specifications. In some implementations, prior to correcting the system level set of API specifications based on the differences, the specification platform may provide, for display, the differences in the set of API specifications, and may request approval to correct the system level set of API specifications. In some implementations, after correcting the set of API specifications based on the differences, the specification platform may replace the system level set of API specifications, in the data structure, with the corrected system level set of API specifications.

In some implementations, the specification platform may process the system level set of API specifications and the system level differences, with a machine learning model, to generate the corrected system level set of API specifications. In such implementations, the machine learning model may include a multi-class classifier model that predicts corrections for the system level differences from a set of possible corrections for system level differences. The specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1F, and by reference number 130, the specification platform may cause the corrected system level set of API specifications to be implemented in the client devices and/or the server devices. For example, the specification platform may provide, to the client devices and/or the server devices, the corrected system level set of API specifications and an instruction to replace the system level set of API specifications with the corrected system level set of API specifications. The client devices and/or the server devices may replace the system level set of API specifications with the corrected system level set of API specifications based on the instruction.

As shown in FIG. 1G, and by reference number 135, the specification platform may process the release level set of API specifications, with a machine learning model, to determine release level differences in the release level set of API specifications. The machine learning model may include the text matching model described above in connection with FIG. 1D. In some implementations, the specification platform may provide a user interface by which a user may select a system (e.g., a system component), a process identifier (e.g., a process flow name), a set of releases (e.g., release dates), and/or the like associated with the release level set of API specifications.

The specification platform may train the machine learning model with historical data (e.g., historical release level sets of API specifications and historical data showing release level differences in the historical release level sets of API specifications) to enable the machine learning model to determine release level differences in a release level set of API specifications. For example, the specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1H, and by reference number 140, the specification platform (e.g., via the machine learning model) may correct the release level set of API specifications, based on the release level differences, to show differences in the release level set of API specifications (e.g., a compared release level mapping). In some implementations, prior to correcting the release level set of API specifications based on the release level differences, the specification platform may provide, for display, the release level differences in the release level set of API specifications, and may request approval to correct the release level set of API specifications. In some implementations, after correcting the release level set of API specifications based on the release level differences, the specification platform may replace the release level set of API specifications, in the data structure, with the corrected release level set of API specifications.

In some implementations, the specification platform may process the release level set of API specifications and the release level differences, with a machine learning model, to generate the corrected release level set of API specifications. In such implementations, the machine learning model may include a multi-class classifier model that predicts corrections for the release level differences from a set of possible corrections for release level differences. The specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1I, and by reference number 145, the specification platform may cause the corrected release level set of API specifications to be implemented in the client devices and/or the server devices. For example, the specification platform may provide, to the client devices and/or the server devices, the corrected release level set of API specifications and an instruction to replace the release level set of API specifications with the corrected release level set of API specifications. The client devices and/or the server devices may replace the release level set of API specifications with the corrected release level set of API specifications based on the instruction.

As shown in FIG. 1J, and by reference number 150, the specification platform may process the version level set of API specifications, with a machine learning model, to determine version level differences in the version level set of API specifications. The machine learning model may include the text matching model described above in connection with FIG. 1D. In some implementations, the specification platform may provide a user interface by which a user may select a system (e.g., a system component), a process identifier (e.g., a process flow name), a set of versions (e.g., version identifiers), and/or the like associated with the version level set of API specifications. In some implementations, the specification platform may include a version control system (e.g., for performing change management).

The specification platform may train the machine learning model with historical data (e.g., historical version level sets of API specifications and historical data showing version level differences in the historical version level sets of API specifications) to enable the machine learning model to determine version level differences in the release level set of API specifications. For example, the specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1K, and by reference number 155, the specification platform may correct the version level set of API specifications, based on the version level differences, to show differences in the version level set of API specifications (e.g., a compared version level mapping). In some implementations, prior to correcting the version level set of API specifications based on the version level differences, the specification platform may provide, for display, the version level differences in the version level set of API specifications, and may request approval to correct the version level set of API specifications. In some implementations, after correcting the version level set of API specifications, the specification platform may replace the version level set of API specifications, in the data structure, with the corrected version level set of API specifications.

In some implementations, the specification platform may process the version level set of API specifications and the version level differences, with a machine learning model, to generate the corrected version level set of API specifications. In such implementations, the machine learning model may include a multi-class classifier model that predicts corrections for the version level differences from a set of possible corrections for version level differences. The specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1L, and by reference number 160, the specification platform may cause the corrected version level set of API specifications to be implemented in the client devices and/or the server devices. For example, the specification platform may provide, to the client devices and/or the server devices, the corrected version level set of API specifications and an instruction to replace the version level set of API specifications with the corrected version level set of API specifications. The client devices and/or the server devices may replace the version level set of API specifications with the corrected version level set of API specifications based on the instruction.

As shown in FIG. 1M, and by reference number 165, the specification platform may receive a new API to be implemented in the client devices and/or the server devices. For example, a user may utilize a client device to generate (e.g., write code for) the new API and may cause the client device to provide the new API to the specification platform. In some implementations, the specification platform may store the new API in the data structure.

As shown in FIG. 1N, and by reference number 170, the specification platform may process the new API and the API specifications, with a machine learning model, to identify issues and/or differences with the new API. In some implementations, the machine learning model may compare the API specifications and the new API, and may identify one or more API specifications that are similar to an API specification that could be generated for the new API. The machine learning model may compare the one or more API specifications with functionality of the new API to identify the issues (e.g., if any) with the new API.

The machine learning model may include the text matching model described above in connection with FIG. 1D. The specification platform may train the machine learning model with historical data (e.g., historical APIs and historical API specifications) to enable the machine learning model to identify issues with the new API. For example, the specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1O, and by reference number 175, the specification platform may correct the issues with the new API to generate a corrected new API. In some implementations, the specification platform may generate a new API specification based on the corrected new API, and may store the new API specification and the corrected new API in the data structure. In some implementations, the specification platform may cause the corrected new API to be implemented in the client devices and/or the server devices.

In some implementations, the specification platform may process the new API and the API specifications, with a machine learning model, to generate the corrected new API. In such implementations, the machine learning model may include a multi-class classifier model that predicts corrections for the new API from a set of possible corrections. The specification platform may train the machine learning model in a manner similar to the machine learning model described above in connection with FIG. 1D. In some implementations, rather than training the machine learning model, the specification platform may obtain the machine learning model from another system or device that trained the machine learning model. In this case, the specification platform may provide the other system or device with historical data for use in training the machine learning model, and may provide the other system or device with updated historical data to retrain the machine learning model in order to update the machine learning model.

As shown in FIG. 1P, and by reference number 180, the specification platform may generate test cases and a new and/or existing API specification for the corrected new API. For example, the specification platform may generate one or more test cases to test the corrected new API, and may test the corrected new API based on the one or more test cases. In some implementations, the specification platform may test the new API with the test cases, and may correct the new API based on results of testing the new API, prior to generating the new API specification.

In some implementations, the specification platform may provide a user interface that enables a user to manage and compare API specifications, as described above. Additionally, the user interface may enable the user to edit the API specifications and/or APIs; may provide one or more graphical representations of the API specifications, the APIs, and/or the like; and/or the like. For example, the specification platform may provide unified modeling language (UML) capability, UML diagrams, and/or the like. Additionally, or alternatively, the specification platform may include change management systems, version control systems, comparison logic models, and/or the like; may enable management of infrastructure stack details, service API inventories, service API mapping tables, and/or the like; may convert an API written in a first format (e.g., JavaScript object notation (JSON)) to the API written in a second format (e.g., Excel); and/or the like.

In this way, a process for identifying and correcting differences in API specifications uses machine learning models to improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed. For example, currently there does not exist a technique that utilizes machine learning to identify and correct differences in API specifications in the manner described herein. Finally, the process for utilizing machine learning to identify and correct differences in API specifications conserves computing resources, networking resources, and/or the like that would otherwise be wasted in executing the current mechanisms, generating inaccurate API specifications and/or APIs, correcting system errors and/or shutdowns due to inaccurate API specifications, and/or like.

As indicated above, FIGS. 1A-1P are provided merely as examples. Other examples may differ from what is described with regard to FIGS. 1A-1P.

Figure 2:
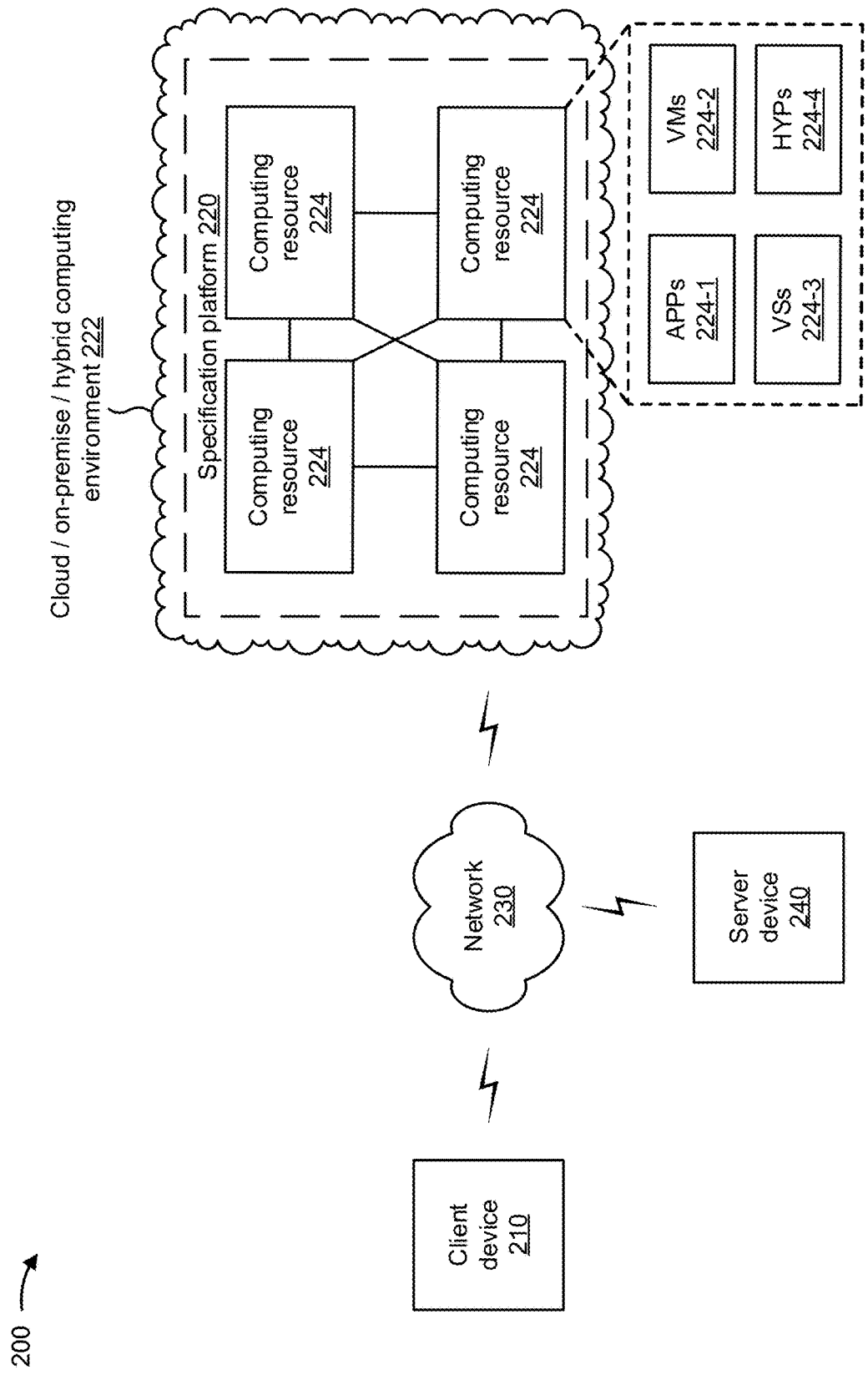
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a specification platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to specification platform 220 and/or server device 240.

Specification platform 220 includes one or more devices that utilize machine learning to identify and correct differences in API specifications. In some implementations, specification platform 220 may be designed to be modular such that certain software components may be swapped in or out depending on a particular need. As such, specification platform 220 may be easily and/or quickly reconfigured for different uses. In some implementations, specification platform 220 may receive information from and/or transmit information to one or more client devices 210 and/or server devices 240.

In some implementations, as shown, specification platform 220 may be hosted in a cloud computing environment 222, an on-premise computing environment, a hybrid (e.g., on-premise and cloud-based) computing environment, and/or the like. Notably, while implementations described herein describe specification platform 220 as being hosted in cloud computing environment 222, in some implementations, specification platform 220 may not be cloud-based (i.e., may be implemented outside of a cloud computing environment) or may be partially cloud-based.

Cloud computing environment 222 includes an environment that hosts specification platform 220. Cloud computing environment 222 may provide computation, software, data access, storage, etc., services that do not require end-user knowledge of a physical location and configuration of system(s) and/or device(s) that hosts specification platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host specification platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with specification platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system. A process virtual machine may execute a single program and may support a single process. In some implementations, virtual machine 224-2 may execute on behalf of a user (e.g., a user of client device 210 or an operator of specification platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or specification platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
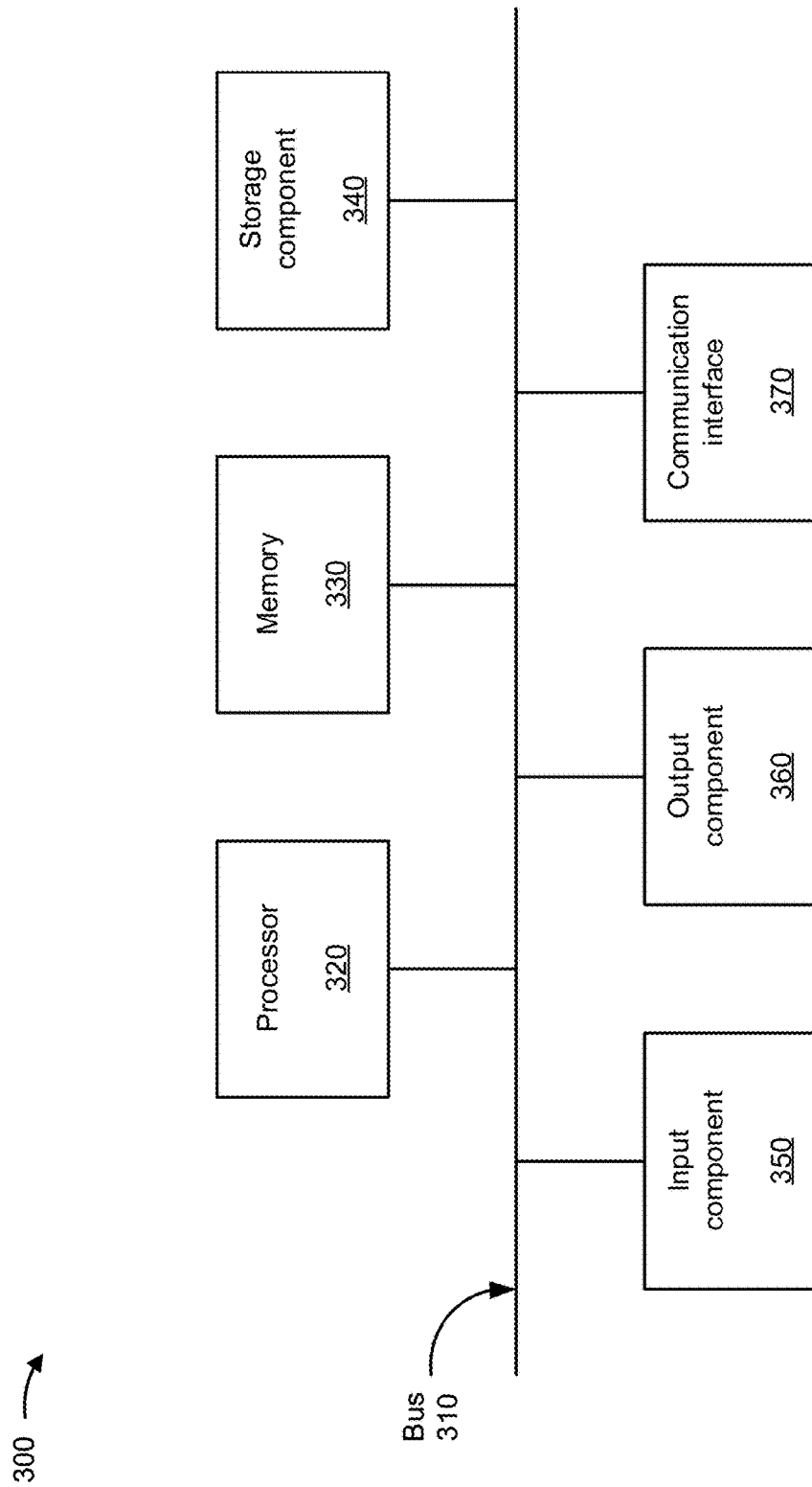
FIG. 3 is a diagram of example components of one or more devices of FIG. 2.

FIG. 3 is a diagram of example components of a device 300. Device 300 may correspond to client device 210, specification platform 220, computing resource 224, and/or server device 240. In some implementations, client device 210, specification platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
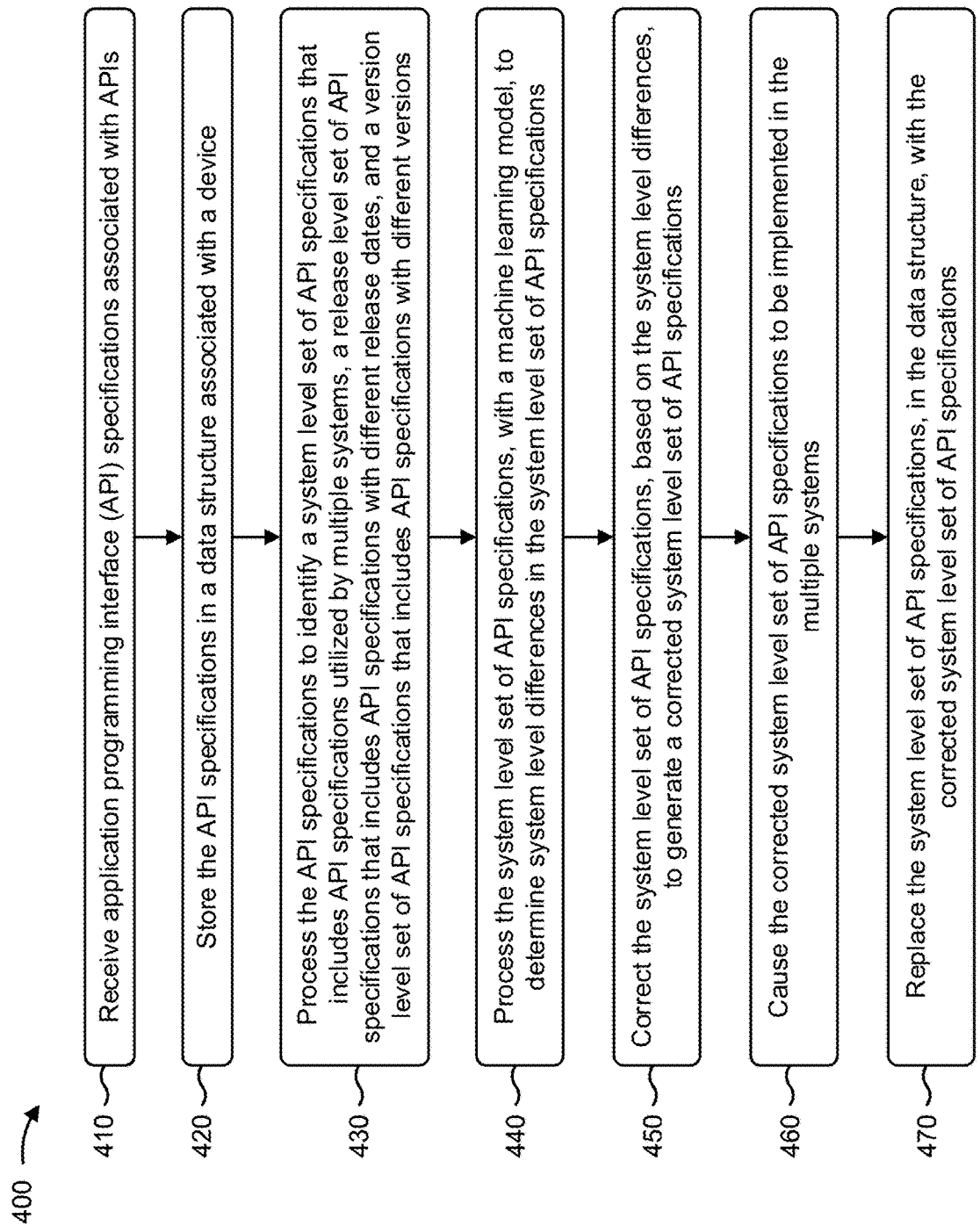
FIGS. 4-6 are flow charts of example processes for utilizing machine learning to identify and correct differences in application programming interface (API) specifications.

FIG. 4 is a flow chart of an example process 400 for utilizing machine learning to identify and correct differences in application programming interface (API) specifications. In some implementations, one or more process blocks of FIG. 4 may be performed by a device (e.g., specification platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving API specifications associated with APIs (block 410). For example, the device (e.g., using computing resource 224, processor 320, communication interface 370, and/or the like) may receive API specifications associated with APIs, as described above.

As further shown in FIG. 4, process 400 may include storing the API specifications in a data structure associated with the device (block 420). For example, the device (e.g., using computing resource 224, processor 320, storage component 340, and/or the like) may store the API specifications in a data structure associated with the device, as described above.

As further shown in FIG. 4, process 400 may include processing the API specifications to identify a system level set of API specifications that includes API specifications utilized by multiple systems, a release level set of API specifications that includes API specifications with different release dates, and a version level set of API specifications that includes API specifications with different versions (block 430). For example, the device (e.g., using computing resource 224, processor 320, memory 330, and/or the like)

may process the API specifications to identify a system level set of API specifications that includes API specifications utilized by multiple systems, a release level set of API specifications that includes API specifications with different release dates, and a version level set of API specifications that includes API specifications with different versions, as described above.

As further shown in FIG. 4, process 400 may include processing the system level set of API specifications, with a machine learning model, to determine system level differences in the system level set of API specifications (block 440). For example, the device (e.g., using computing resource 224, processor 320, storage component 340, and/or the like) may process the system level set of API specifications, with a machine learning model, to determine system level differences in the system level set of API specifications, as described above.

As further shown in FIG. 4, process 400 may include correcting the system level set of API specifications, based on the system level differences, to generate a corrected system level set of API specifications (block 450). For example, the device (e.g., using computing resource 224, processor 320, memory 330, storage component 340, and/or the like) may correct the system level set of API specifications, based on the system level differences, to generate a corrected system level set of API specifications, as described above.

As further shown in FIG. 4, process 400 may include causing the corrected system level set of API specifications to be implemented in the multiple systems (block 460). For example, the device (e.g., using computing resource 224, processor 320, memory 330, storage component 340, communication interface 370, and/or the like) may cause the corrected system level set of API specifications to be implemented in the multiple systems, as described above.

As further shown in FIG. 4, process 400 may include replacing the system level set of API specifications, in the data structure, with the corrected system level set of API specifications (block 470). For example, the device (e.g., using computing resource 224, processor 320, storage component 340, and/or the like) may replace the system level set of API specifications, in the data structure, with the corrected system level set of API specifications, as described above.

Process 400 may include additional implementations, such as any single implementation or any combination of implementations described below and/or in connection with one or more other processes described elsewhere herein.

In a first implementation, process 400 may include processing the release level set of API specifications, with the machine learning model, to determine release level differences in the release level set of API specifications; correcting the release level set of API specifications, based on the release level differences, to generate a corrected release level set of API specifications; and causing the corrected release level set of API specifications to be implemented in the multiple systems.

In a second implementation, alone or in combination with the first implementation, process 400 may include replacing the release level set of API specifications, in the data structure, with the corrected release level set of API specifications.

In a third implementation, alone or in combination with one or more of the first and second implementations, process 400 may include providing, for display, the release level differences in the release level set of API specifications prior to correcting the release level set of API specifications based on the release level differences; and requesting approval to correct the release level set of API specifications prior to correcting the release level set of API specifications based on the release level differences.

In a fourth implementation, alone or in combination with one or more of the first through third implementations, process 400 may include processing the version level set of API specifications, with the machine learning model, to determine version level differences in the version level set of API specifications; correcting the version level set of API specifications, based on the version level differences, to generate a corrected version level set of API specifications; and causing the corrected version level set of API specifications to be implemented in the multiple systems.

In a fifth implementation, alone or in combination with one or more of the first through fourth implementations, process 400 may include replacing the version level set of API specifications, in the data structure, with the corrected version level set of API specifications.

In a sixth implementation, alone or in combination with one or more of the first through fifth implementations, process 400 may include providing, for display, the version level differences in the version level set of API specifications prior to correcting the version level set of API specifications based on the version level differences; and requesting approval to correct the version level set of API specifications prior to correcting the version level set of API specifications based on the version level differences.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
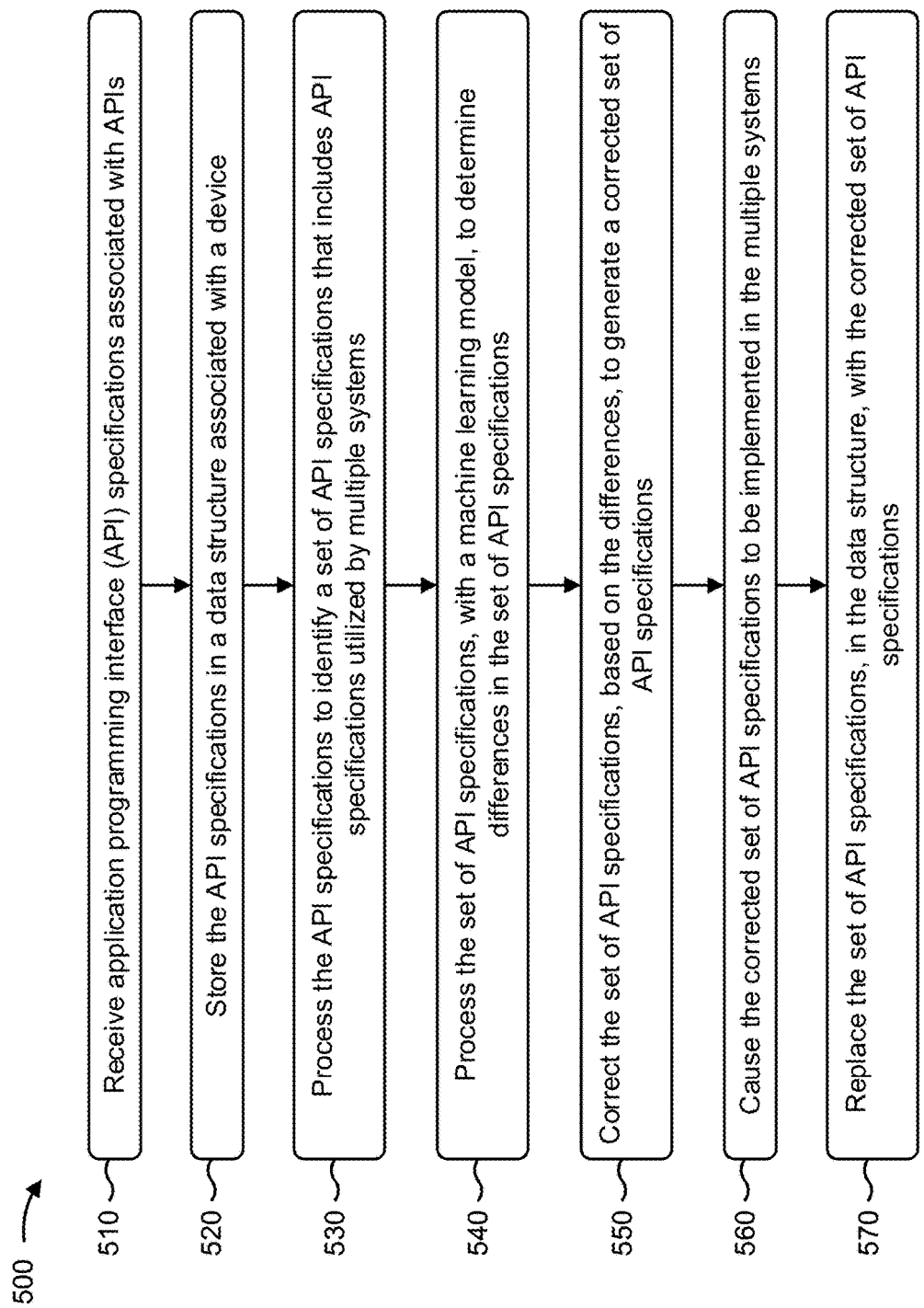

FIG. 5 is a flow chart of an example process 500 for utilizing machine learning to identify and correct differences in API specifications. In some implementations, one or more process blocks of FIG. 5 may be performed by a device (e.g., specification platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving API specifications associated with APIs (block 510). For example, the device (e.g., using computing resource 224, processor 320, communication interface 370, and/or the like) may receive API specifications associated with APIs, as described above.

As further shown in FIG. 5, process 500 may include storing the API specifications in a data structure associated with the device (block 520). For example, the device (e.g., using computing resource 224, processor 320, storage component 340, and/or the like) may store the API specifications in a data structure associated with the device, as described above.

As further shown in FIG. 5, process 500 may include processing the API specifications to identify a set of API specifications that includes API specifications utilized by multiple systems (block 530). For example, the device (e.g., using computing resource 224, processor 320, memory 330, and/or the like) may process the API specifications to identify a set of API specifications that includes API specifications utilized by multiple systems, as described above.

As further shown in FIG. 5, process 500 may include processing the set of API specifications, with a machine learning model, to determine differences in the set of API specifications (block 540). For example, the device (e.g., using computing resource 224, processor 320, memory 330, storage component 340, and/or the like) may process the set of API specifications, with a machine learning model, to determine differences in the set of API specifications, as described above.

As further shown in FIG. 5, process 500 may include correcting the set of API specifications, based on the differences, to generate a corrected set of API specifications (block 550). For example, the device (e.g., using computing resource 224, processor 320, memory 330, storage component 340, communication interface 370, and/or the like) may correct the set of API specifications, based on the differences, to generate a corrected set of API specifications, as described above.

As further shown in FIG. 5, process 500 may include causing the corrected set of API specifications to be implemented in the multiple systems (block 560). For example, the device (e.g., using computing resource 224, processor 320, memory 330, storage component 340, communication interface 370, and/or the like) may cause the corrected set of API specifications to be implemented in the multiple systems, as described above.

As further shown in FIG. 5, process 500 may include replacing the set of API specifications, in the data structure, with the corrected set of API specifications (block 570). For example, the device (e.g., using computing resource 224, processor 320, storage component 340, and/or the like) may replace the set of API specifications, in the data structure, with the corrected set of API specifications, as described above.

Process 500 may include additional implementations, such as any single implementation or any combination of implementations described below and/or in connection with one or more other processes described elsewhere herein.

In a first implementation, process 500 may include providing, for display, the differences in the set of API specifications prior to correcting the set of API specifications based on the differences; and requesting approval to correct the set of API specifications prior to correcting the set of API specifications based on the differences.

In a second implementation, alone or in combination with the first implementation, process 500 may include receiving a new API to be implemented in the multiple systems; processing the new API and the API specifications, with the machine learning model, to identify issues with the new API; correcting the issues with the new API to generate a corrected new API; and performing one or more actions based on the corrected new API.

In a third implementation, alone or in combination with one or more of the first and second implementations, performing the one or more actions may include generating a new API specification based on the corrected new API, and storing the new API specification and the corrected new API in the data structure.

In a fourth implementation, alone or in combination with one or more of the first through third implementations, performing the one or more actions may include causing the corrected new API to be implemented in the multiple systems.

In a fifth implementation, alone or in combination with one or more of the first through fourth implementations, performing the one or more actions may include generating a test case to test the corrected new API, and testing the corrected new API based on the test case.

In a sixth implementation, alone or in combination with one or more of the first through fifth implementations, process 500 may include receiving information indicating a modification made to one of the APIs; updating one of the API specifications, that corresponds to the one of the APIs, based on the modification and to generate a modified API specification; and replacing the one of the API specifications with the modified API specification in the data structure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
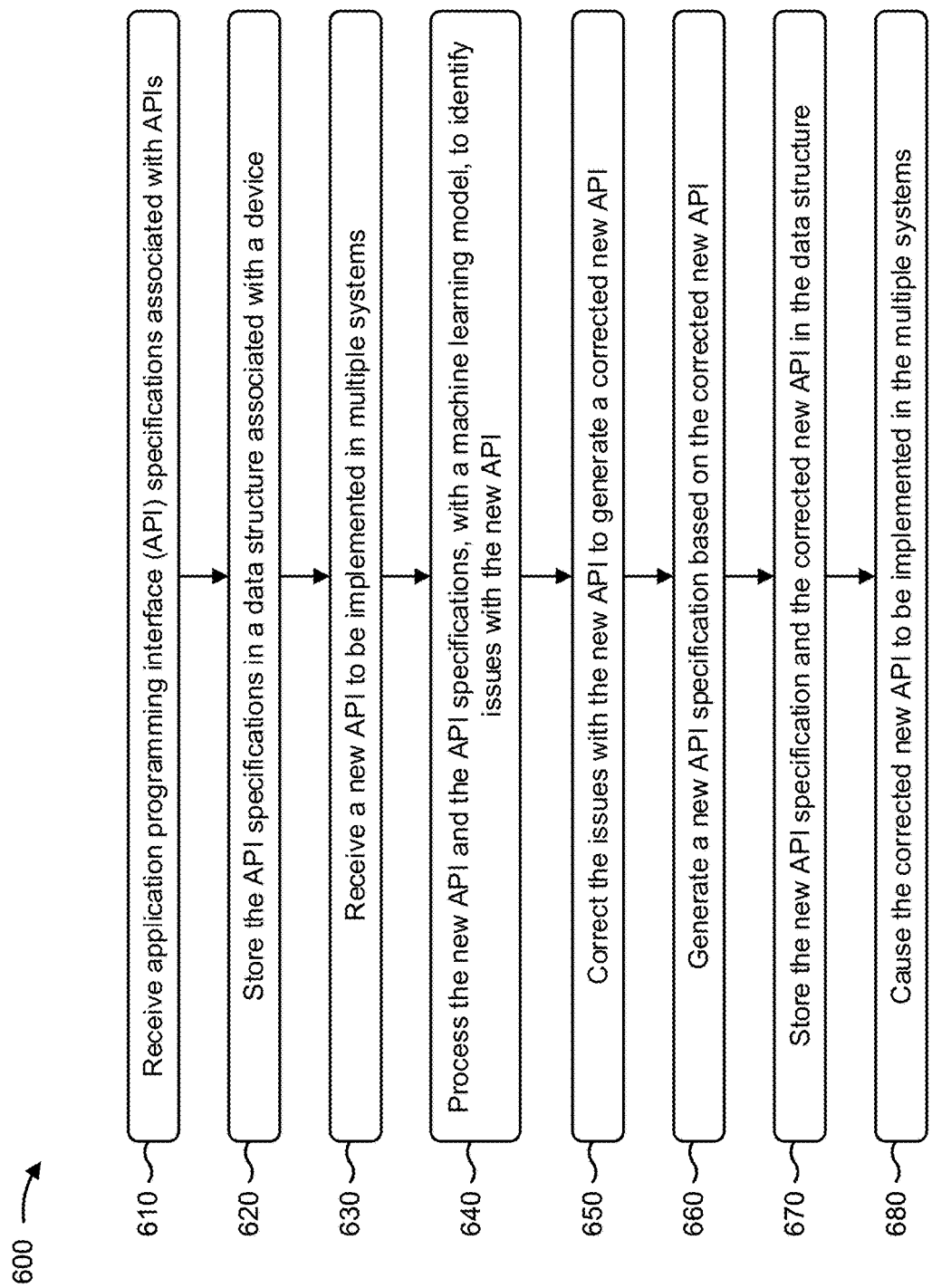

FIG. 6 is a flow chart of an example process 600 for utilizing machine learning to identify and correct differences in API specifications. In some implementations, one or more process blocks of FIG. 6 may be performed by a device (e.g., specification platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving API specifications associated with APIs (block 610). For example, the device (e.g., using computing resource 224, processor 320, communication interface 370, and/or the like) may receive API specifications associated with APIs, as described above.

As further shown in FIG. 6, process 600 may include storing the API specifications in a data structure associated with the device (block 620). For example, the device (e.g., using computing resource 224, processor 320, storage component 340, and/or the like) may store the API specifications in a data structure associated with the device, as described above.

As further shown in FIG. 6, process 600 may include receiving a new API to be implemented in multiple systems (block 630). For example, the device (e.g., using computing resource 224, processor 320, communication interface 370, and/or the like) may receive a new API to be implemented in multiple systems, as described above.

As further shown in FIG. 6, process 600 may include processing the new API and the API specifications, with a machine learning model, to identify issues with the new API (block 640). For example, the device (e.g., using computing resource 224, processor 320, memory 330, and/or the like) may process the new API and the API specifications, with a machine learning model, to identify issues with the new API, as described above.

As further shown in FIG. 6, process 600 may include correcting the issues with the new API to generate a corrected new API (block 650). For example, the device (e.g., using computing resource 224, processor 320, memory 330, and/or the like) may correct the issues with the new API to generate a corrected new API, as described above.

As further shown in FIG. 6, process 600 may include generating a new API specification based on the corrected new API (block 660). For example, the device (e.g., using computing resource 224, processor 320, storage component 340, and/or the like) may generate a new API specification based on the corrected new API, as described above.

As further shown in FIG. 6, process 600 may include storing the new API specification and the corrected new API in the data structure (block 670). For example, the device (e.g., using computing resource 224, processor 320, storage component 340, and/or the like) may store the new API specification and the corrected new API in the data structure, as described above.

As further shown in FIG. 6, process 600 may include causing the corrected new API to be implemented in the multiple systems (block 680). For example, the device (e.g., using computing resource 224, processor 320, memory 330, storage component 340, communication interface 370, and/or the like) may cause the corrected new API to be implemented in the multiple systems, as described above.

Process 600 may include additional implementations, such as any single implementation or any combination of implementations described below and/or in connection with one or more other processes described elsewhere herein.

In a first implementation, process 600 may include processing the API specifications to identify a system level set of API specifications that includes API specifications utilized by the multiple systems; processing the system level set of API specifications, with the machine learning model, to determine system level differences in the system level set of API specifications; correcting the system level set of API specifications, based on the system level differences, to generate a corrected system level set of API specifications; and causing the corrected system level set of API specifications to be implemented in the multiple systems.

In a second implementation, alone or in combination with the first implementation, process 600 may include processing the API specifications to identify a release level set of API specifications that includes API specifications with different release dates; processing the release level set of API specifications, with the machine learning model, to determine release level differences in the release level set of API specifications; correcting the release level set of API specifications, based on the release level differences, to generate a corrected release level set of API specifications; and causing the corrected release level set of API specifications to be implemented in the multiple systems.

In a third implementation, alone or in combination with one or more of the first and second implementations, process 600 may include processing the API specifications to identify a version level set of API specifications that includes API specifications with different versions; processing the version level set of API specifications, with the machine learning model, to determine version level differences in the version level set of API specifications; correcting the version level set of API specifications, based on the version level differences, to generate a corrected version level set of API specifications; and causing the corrected version level set of API specifications to be implemented in the multiple systems.

In a fourth implementation, alone or in combination with one or more of the first through third implementations, process 600 may include generating one or more test cases to test the corrected new API, and testing the corrected new API based on the one or more test cases.

In a fifth implementation, alone or in combination with one or more of the first through fourth implementations, process 600 may include receiving information indicating a modification made to one of the APIs; updating one of the API specifications, that corresponds to the one of the APIs, based on the modification and to generate a modified API specification; and replacing the one of the API specifications with the modified API specification in the data structure.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, application programming interface (API) specifications associated with APIs;
storing, by the device, the API specifications in a data structure associated with the device;
processing, by the device, the API specifications to identify:
a system level set of API specifications that includes API specifications utilized by multiple systems, and
a version level set of API specifications that includes API specifications with different version identifiers;
processing, by the device, the system level set of API specifications, with a machine learning model, to determine system level differences in the system level set of API specifications;
correcting, by the device, the system level set of API specifications, based on the system level differences, to generate a corrected system level set of API specifications;

causing, by the device, the corrected system level set of API specifications to be implemented in the multiple systems; and replacing, by the device, the system level set of API specifications, in the data structure, with the corrected system level set of API specifications.

2. The method of claim 1, further comprising:

processing API specifications to identify a release level set of API specifications that includes API specifications with different release dates;

processing the release level set of API specifications, with the machine learning model, to determine release level differences in the release level set of API specifications;

correcting the release level set of API specifications, based on the release level differences, to generate a corrected release level set of API specifications; and causing the corrected release level set of API specifications to be implemented in the multiple systems.

3. The method of claim 2, further comprising:

replacing the release level set of API specifications, in the data structure, with the corrected release level set of API specifications.

4. The method of claim 2, further comprising:

providing, for display, the release level differences in the release level set of API specifications prior to correcting the release level set of API specifications based on the release level differences; and requesting approval to correct the release level set of API specifications prior to correcting the release level set of API specifications based on the release level differences.

5. The method of claim 1, further comprising:

processing the version level set of API specifications, with the machine learning model, to determine version level differences in the version level set of API specifications;

correcting the version level set of API specifications, based on the version level differences, to generate a corrected version level set of API specifications; and causing the corrected version level set of API specifications to be implemented in the multiple systems.

6. The method of claim 5, further comprising:

replacing the version level set of API specifications, in the data structure, with the corrected version level set of API specifications.

7. The method of claim 5, further comprising:

providing, for display, the version level differences in the version level set of API specifications prior to correcting the version level set of API specifications based on the version level differences; and requesting approval to correct the version level set of API specifications prior to correcting the version level set of API specifications based on the version level differences.

8. A device, comprising:

one or more memories; and one or more processors, communicatively coupled to the one or more memories, configured to:

receive application programming interface (API) specifications associated with APIs;

store the API specifications in a data structure associated with the device;

process the API specifications to identify a release level set of API specifications that includes API specifications with different release dates;

process the release level set of API specifications, with a machine learning model, to determine release level differences in the release level set of API specifications;

correct the release level set of API specifications, based on the differences, to generate a corrected release level set of API specifications; and cause the corrected release level set of API specifications to be implemented in multiple systems.

9. The device of claim 8, wherein the one or more processors are further configured to:

provide, for display, the differences in the release level set of API specifications prior to correcting the release level set of API specifications based on the differences; and request approval to correct the release level set of API specifications prior to correcting the release level set of API specifications based on the differences.

10. The device of claim 8, wherein the one or more processors are further configured to:

receive a new API to be implemented in the multiple systems;

process the new API and the API specifications, with the machine learning model, to identify issues with the new API;

correct the issues with the new API to generate a corrected new API; and perform one or more actions based on the corrected new API.

11. The device of claim 10, wherein the one or more processors, when performing the one or more actions, are configured to:

generate a new API specification based on the corrected new API; and store the new API specification and the corrected new API in the data structure.

12. The device of claim 10, wherein the one or more processors, when performing the one or more actions, are configured to:

cause the corrected new API to be implemented in the multiple systems.

13. The device of claim 10, wherein the one or more processors, when performing the one or more actions, are configured to:

generate a test case to test the corrected new API; and test the corrected new API based on the test case.

14. The device of claim 8, wherein the one or more processors are further configured to:

receive information indicating a modification made to one of the APIs;

update one of the API specifications, that corresponds to the one of the APIs, based on the modification and to generate a modified API specification; and replace the one of the API specifications with the modified API specification in the data structure.

15. A non-transitory computer-readable medium storing instructions, the instructions comprising:

one or more instructions that, when executed by one or more processors of a device, cause the one or more processors to:

receive application programming interface (API) specifications associated with APIs;

store the API specifications in a data structure associated with the device;

receive a new API to be implemented in multiple systems;

process the new API and the API specifications, with a machine learning model, to identify issues with the new API by comparing the API specifications with functionality of the new API to identify the issues with the new API;

correct the issues with the new API to generate a corrected new API;

generate a new API specification based on the corrected new API;

store the new API specification and the corrected new API in the data structure; and cause the corrected new API to be implemented in the multiple systems.

16. The non-transitory computer-readable medium of claim 15, wherein the instructions further comprise:

one or more instructions that, when executed by the one or more processors, cause the one or more processors to:

process the API specifications to identify a system level set of API specifications that includes API specifications utilized by the multiple systems;

process the system level set of API specifications, with the machine learning model, to determine system level differences in the system level set of API specifications;

correct the system level set of API specifications, based on the system level differences, to generate a corrected system level set of API specifications; and cause the corrected system level set of API specifications to be implemented in the multiple systems.

17. The non-transitory computer-readable medium of claim 15, wherein the instructions further comprise:

one or more instructions that, when executed by the one or more processors, cause the one or more processors to:

process the API specifications to identify a release level set of API specifications that includes API specifications with different release dates;

process the release level set of API specifications, with the machine learning model, to determine release level differences in the release level set of API specifications;

correct the release level set of API specifications, based on the release level differences, to generate a corrected release level set of API specifications; and cause the corrected release level set of API specifications to be implemented in the multiple systems.

18. The non-transitory computer-readable medium of claim 15, wherein the instructions further comprise:

one or more instructions that, when executed by the one or more processors, cause the one or more processors to:

process the API specifications to identify a version level set of API specifications that includes API specifications with different version identifiers;

process the version level set of API specifications, with the machine learning model, to determine version level differences in the version level set of API specifications;

correct the version level set of API specifications, based on the version level differences, to generate a corrected version level set of API specifications; and cause the corrected version level set of API specifications to be implemented in the multiple systems.

19. The non-transitory computer-readable medium of claim 15, wherein the instructions further comprise:

one or more instructions that, when executed by the one or more processors, cause the one or more processors to:

generate one or more test cases to test the corrected new API; and test the corrected new API based on the one or more test cases.

20. The non-transitory computer-readable medium of claim 15, wherein the instructions further comprise:

one or more instructions that, when executed by the one or more processors, cause the one or more processors to:

receive information indicating a modification made to one of the APIs;

update one of the API specifications, that corresponds to the one of the APIs, based on the modification and to generate a modified API specification; and replace the one of the API specifications with the modified API specification in the data structure.

\* \* \* \* \*